United States Patent [19]
Watkins

[11] 3,982,816
[45] Sept. 28, 1976

[54] METHOD FOR MEASURING THE PARAMETERS OF OPTICAL FIBERS

[75] Inventor: Laurence Shrapnell Watkins, Hopewell Township, Mercer County, N.J.

[73] Assignee: Western Electric Company, Inc., New York, N.Y.

[22] Filed: June 21, 1974

[21] Appl. No.: 482,707

[52] U.S. Cl. .............................. 356/103; 356/111; 356/159
[51] Int. Cl.² .................... G01N 21/00; G01B 9/02; G01B 11/04
[58] Field of Search ............... 356/103, 104, 106 R, 356/109, 111, 159, 160; 250/571, 572

[56] References Cited
UNITED STATES PATENTS

| | | |
|---|---|---|
| 3,518,007 | 6/1970 | Ito ....................................... 356/159 |
| 3,730,842 | 5/1973 | Wyatt et al. ......................... 356/103 |
| 3,770,351 | 11/1973 | Wyatt ................................. 356/104 |
| 3,883,249 | 5/1975 | Pryor ................................. 356/111 |

Primary Examiner—John K. Corbin
Assistant Examiner—Conrad Clark
Attorney, Agent, or Firm—B. W. Sheffield; G. D. Green; M. Y. Epstein

[57] ABSTRACT

Parameters of a clad optical fiber are measured by irradiating the fiber with a laser beam to generate a scattering pattern. Measurements are made of fringes and modulations in the scattering pattern and these measurements are translated into such parameters as core and fiber diameter.

19 Claims, 29 Drawing Figures

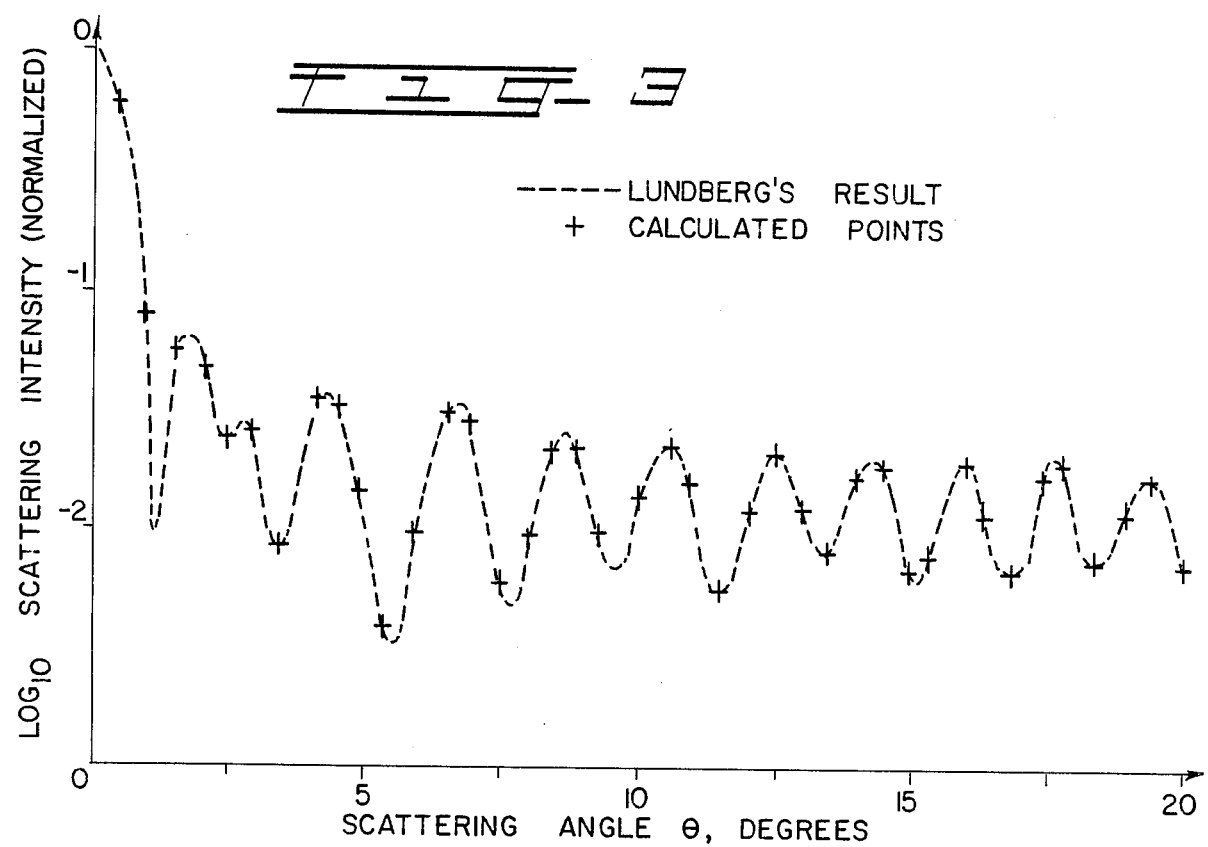
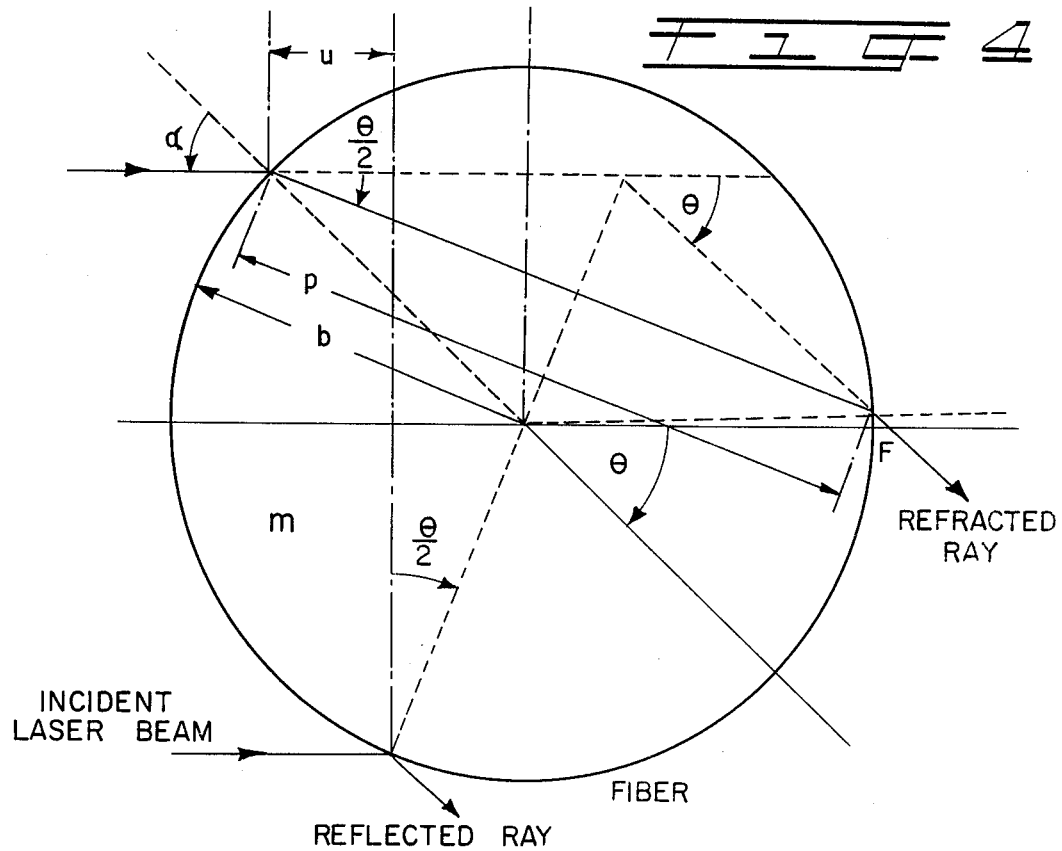

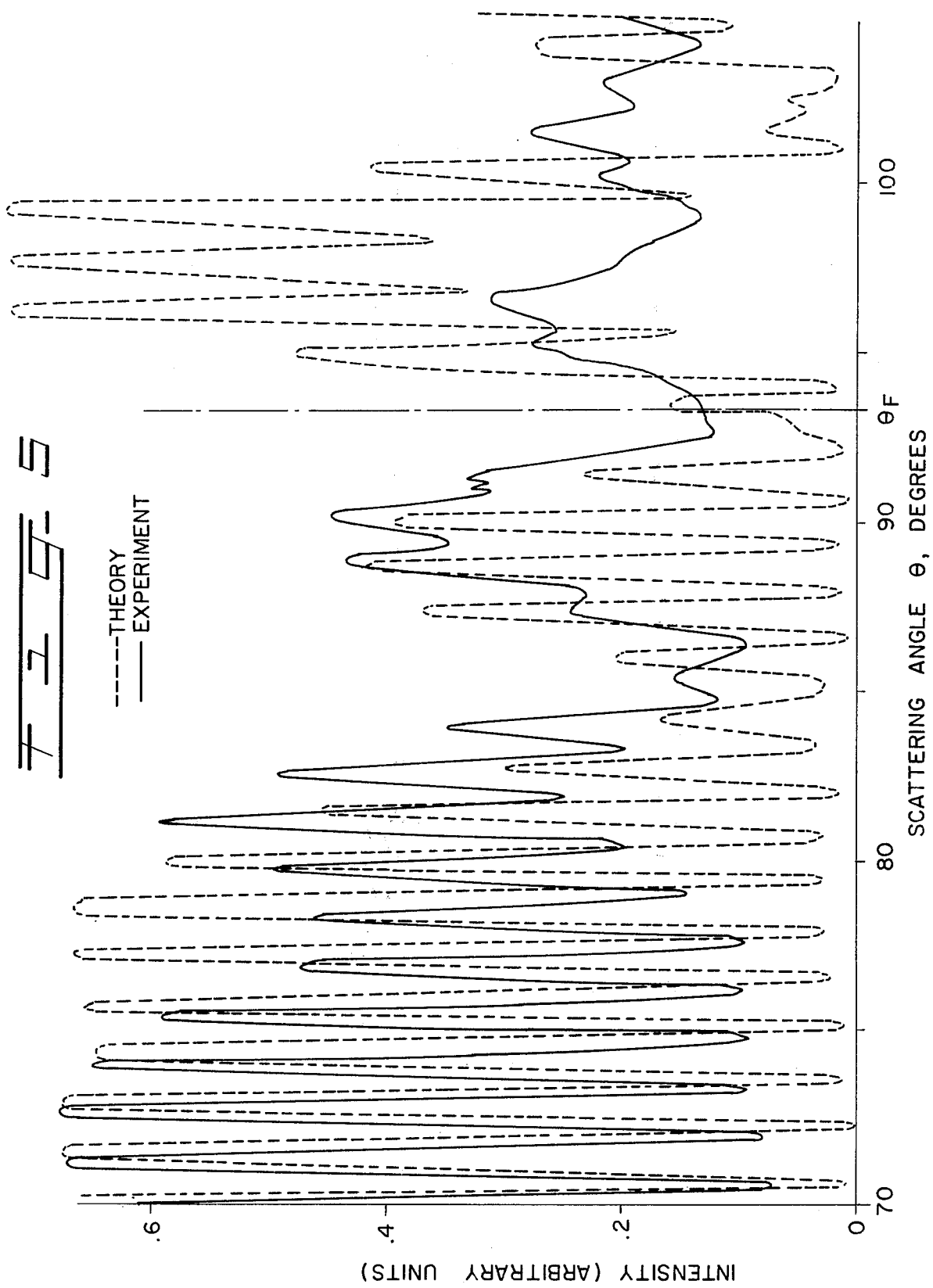

THEORY -----
EXPERIMENT ———

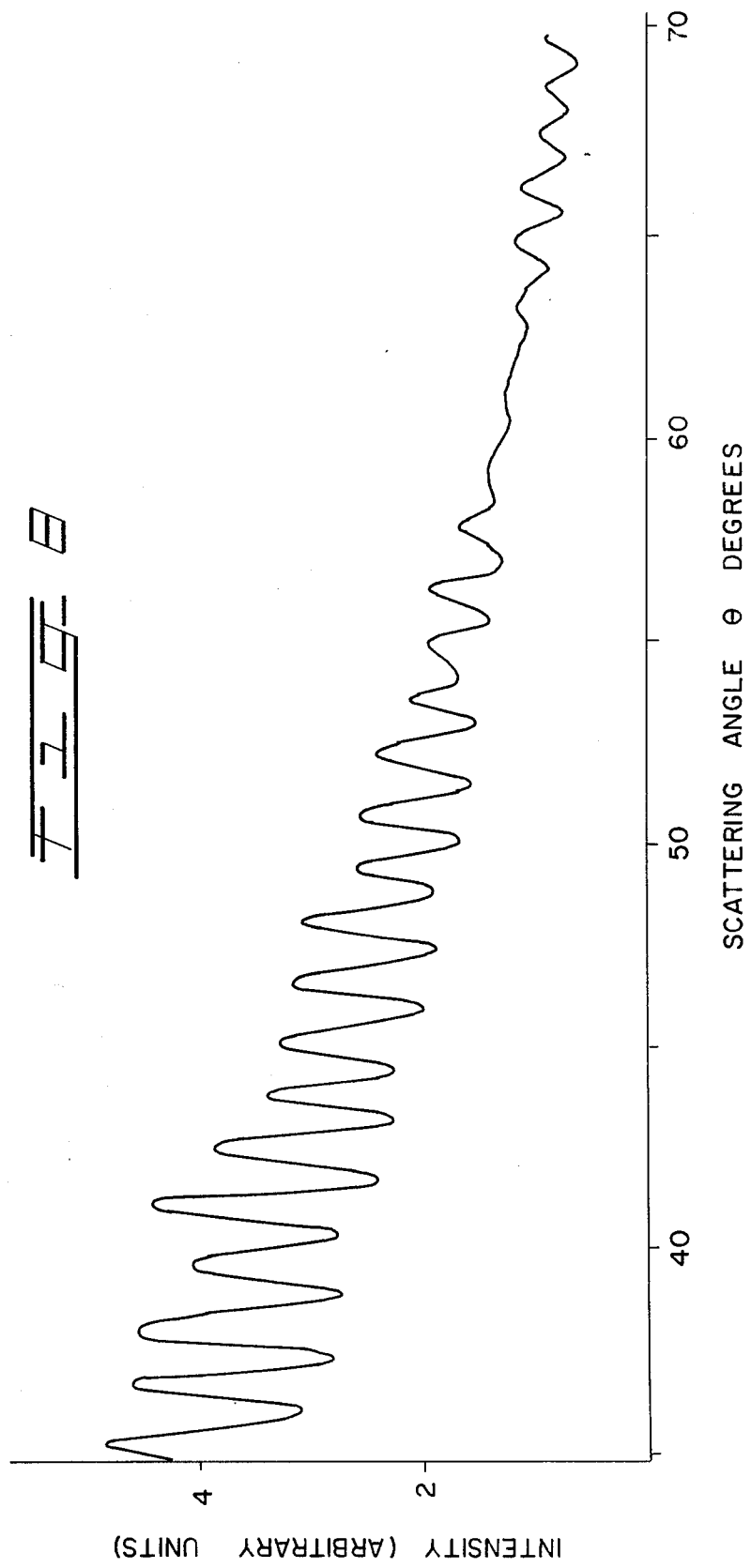

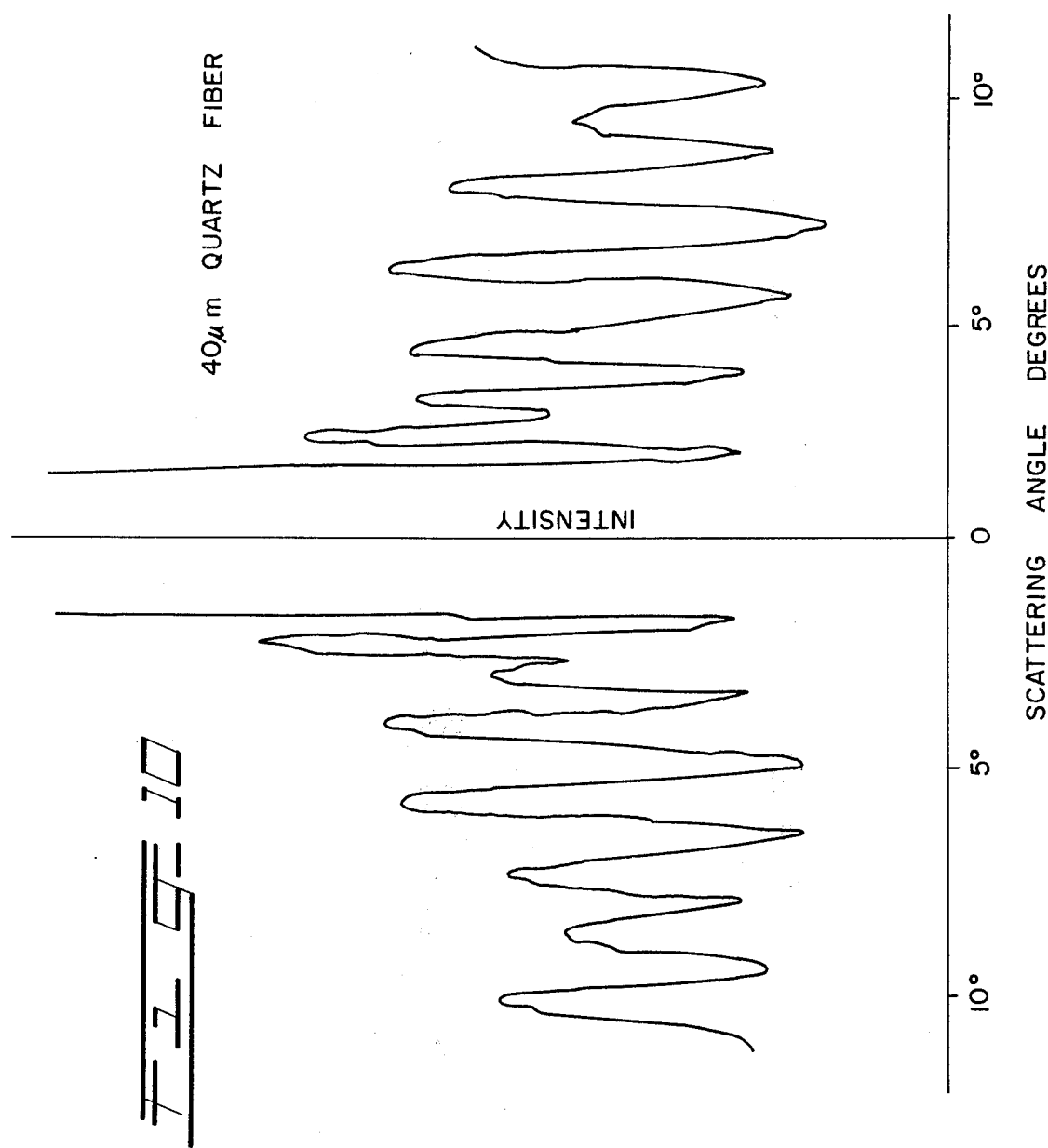

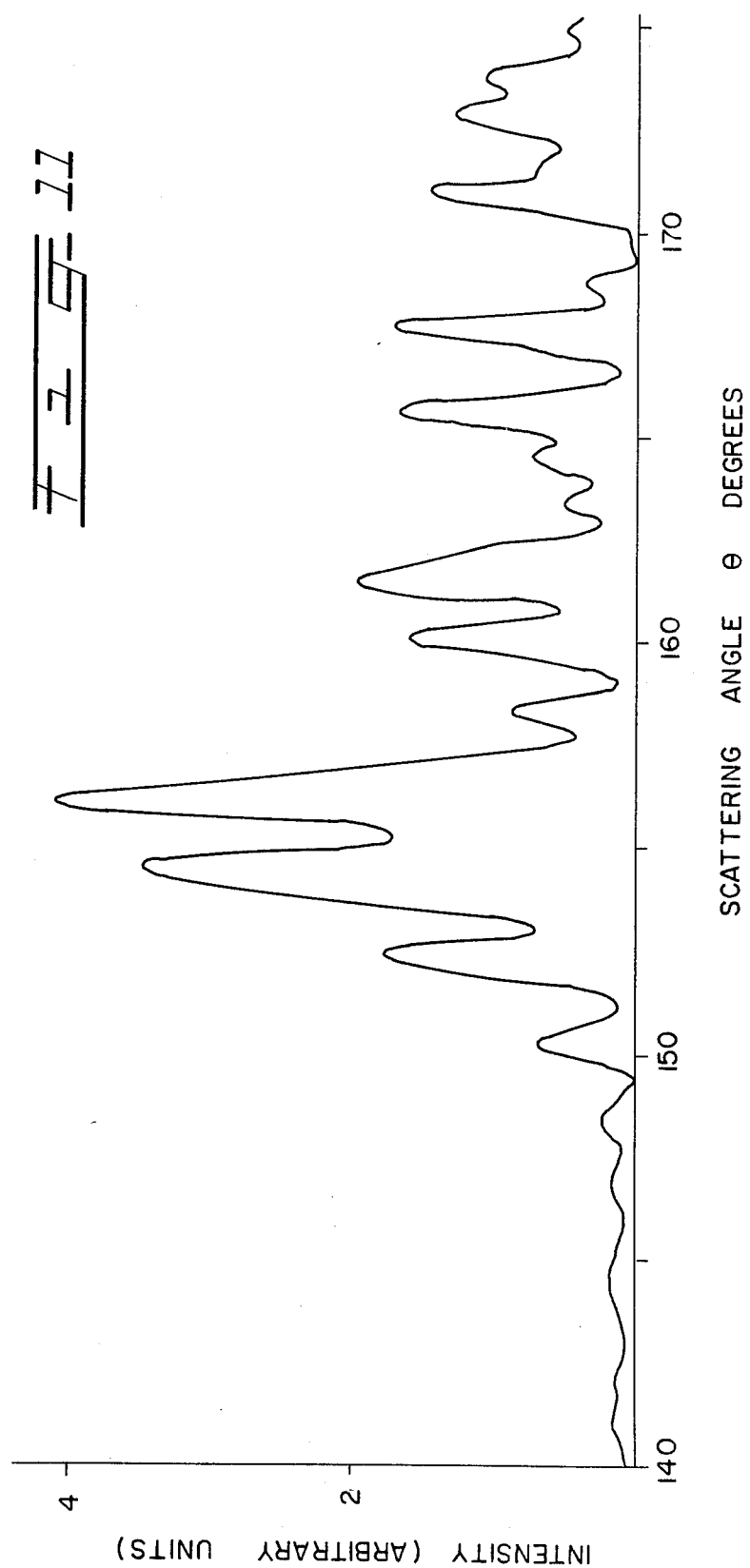

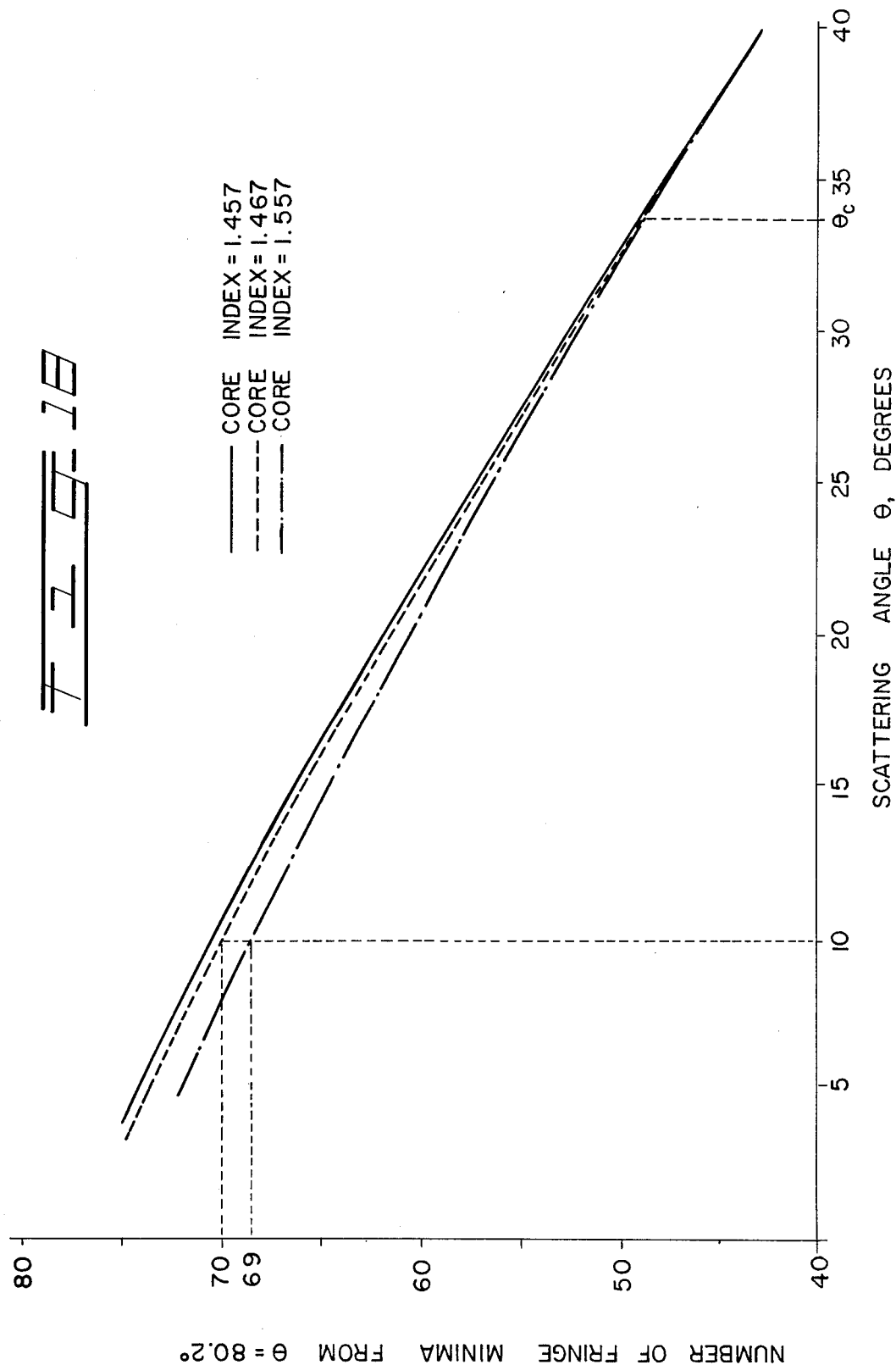

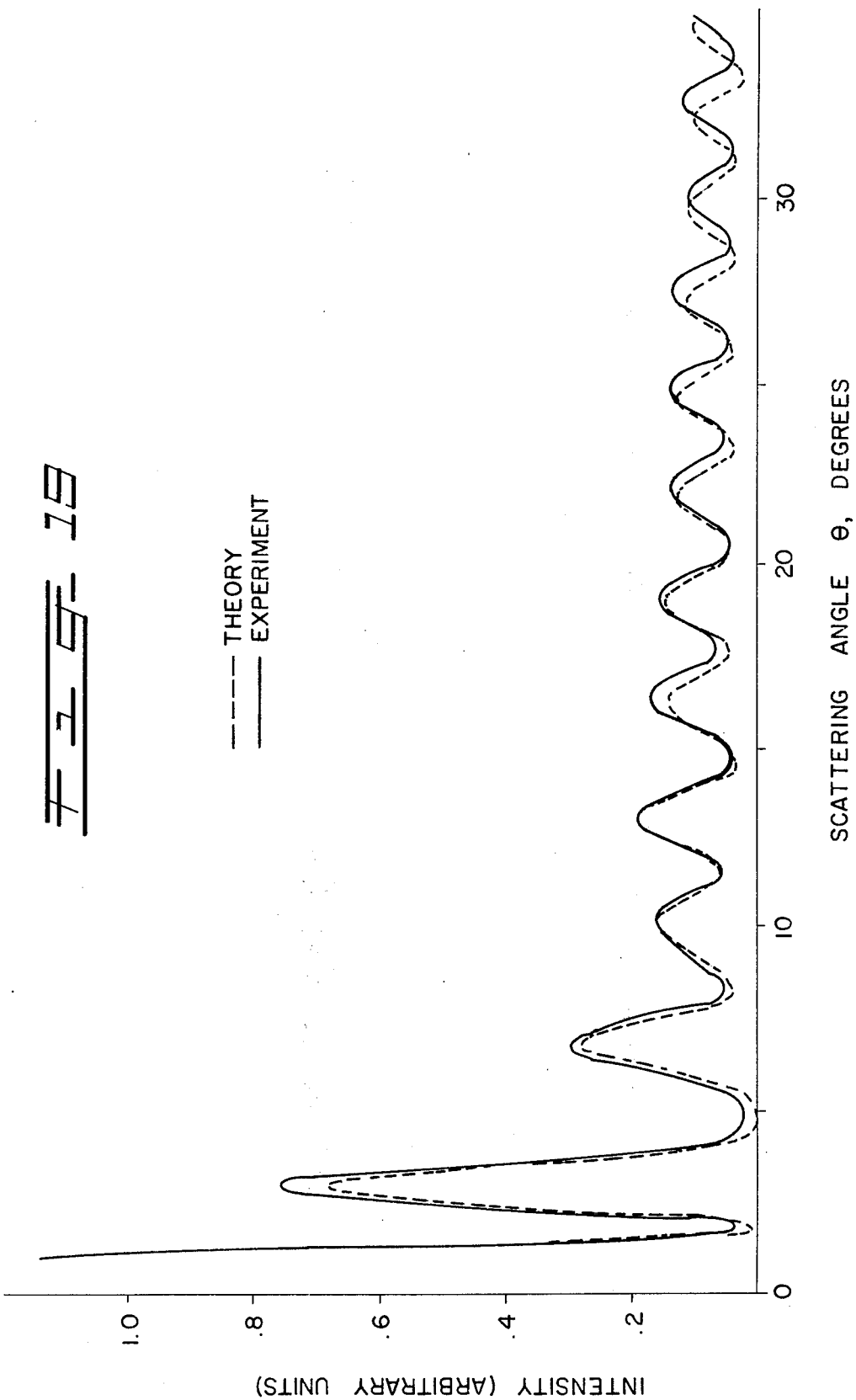

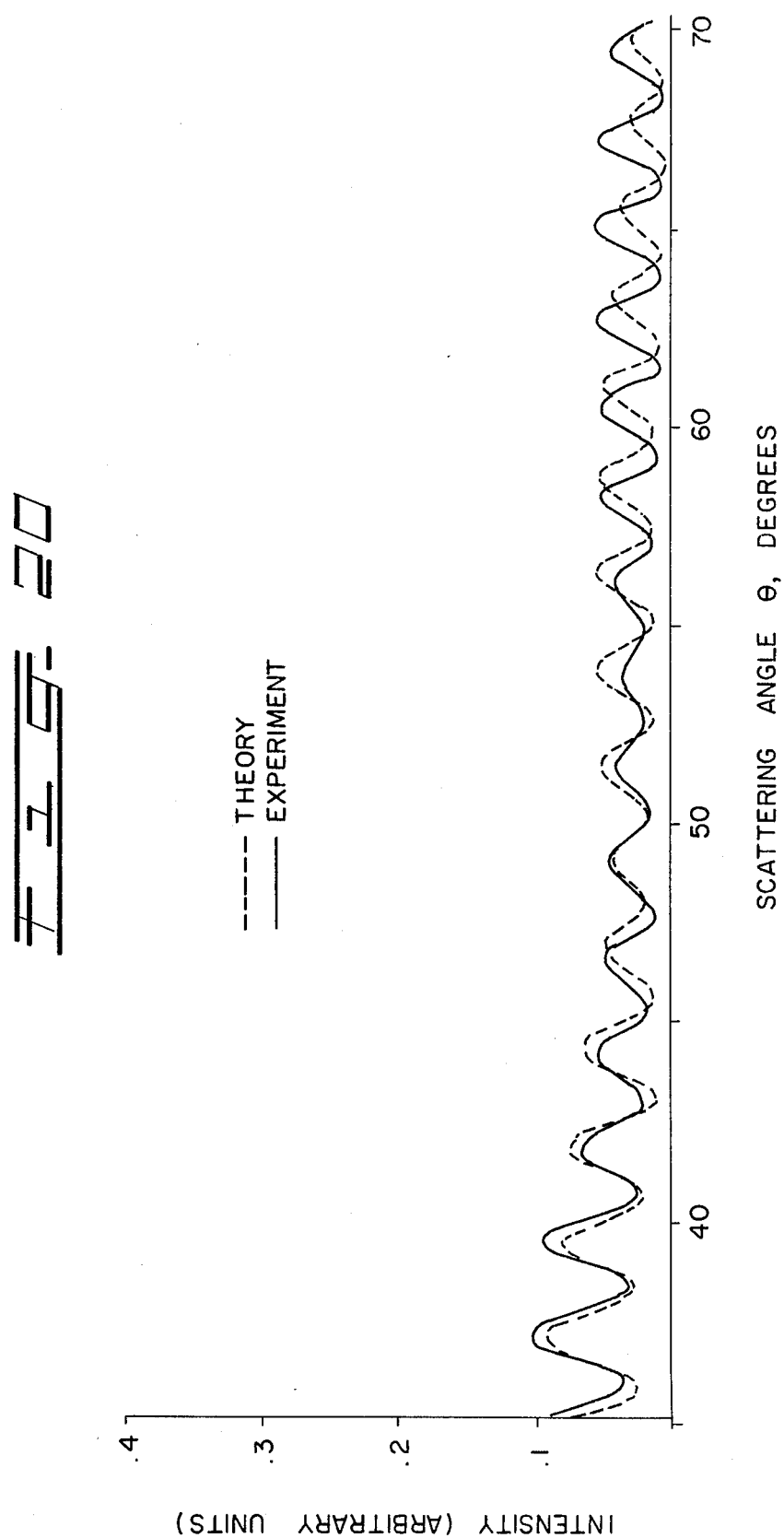

METHOD FOR MEASURING THE PARAMETERS OF OPTICAL FIBERS

BACKGROUND OF THE INVENTION

1. Field of the Invention

Broadly speaking, this invention relates to methods for measuring the parameters of a filament. More particularly, this invention relates to methods for measuring properties of clad optical fibers, and the like.

2. Discussion of the Prior Art

In the manufacture of high quality optical fibers, for example, for use in optical communication systems, it is virtually mandatory that such important fiber parameters as core diameter and circularity, cladding thickness, and core and cladding refractive index be continuously monitored during the manufacturing process. Also, because an optical fiber is relatively fragile, it is important that the methods employed to measure these parameters do not damage the fiber in any way.

It is, of course, well known to employ a laser beam to measure the diameter of a fine metal wire. See, for example, *Lasers in Industry*, S. S. Charschan, editor, Van Nostrand Reinhold Co. (1973) page 393 et seq. As taught in that publication, a laser beam directed at the wire to be measured generates the far-field Fraunhofer diffraction pattern of the wire. By measuring the spacing between successive maxima and minima in the diffraction pattern, and knowing the wavelength of the laser beam, it is a relatively easy matter to compute the diameter of the wire.

U.S. Pat. No. 3,709,610, which issued on Jan. 9, 1973 in the name of Herman A. Kreugle, suggests that this known technique may also be applied to measure the diameter of transparent, thermo-plastic filaments, such as rayon, nylon and acetate yarn. In a gross sense, this is true, bearing in mind that such fibers are not truly transparent but are more properly described as translucent. Thus, while the diffraction pattern generated from such a filament is complex, including contributions to the pattern caused by internal refraction through the yarn, the end result is essentially the same diffraction pattern that would be generated by an opaque filament, albeit of reduced contrast. Indeed, the Kreugle patent discloses several techniques for successively detecting this reduced contrast diffraction pattern, including the technique of dying the yarn to render it opaque. See also the article by W. A. Farone and M. Kerker in the *Journal of the Optical Society of America*, Vol. 56 (1966) page 481 et seq., and the article by J. L. Lundberg in *Journal of Colloid and Interface Science*, Vol. 29, No. 3 (March 1969) at page 565 et seq.

Unfortunately, the measurement techniques disclosed by Kreugle are totally unsuited for use on high quality optical fiber. Firstly, because these fibers are designed for use in low-loss optical communication systems, they are far more transparent than the translucent yarns measured by Kreugle. Thus, the contribution that the internally refracted rays make to the overall Fraunhofer pattern is considerably greater and cannot be ignored. In addition, reflection from the filament becomes increasingly significant and also cannot be ignored. Because of this, Kreugle's basic assumption, that the complex diffraction pattern generated by a translucent yarn can be treated as if it were an ordinary diffraction pattern, is incorrect when applied to the measurement of an optical fiber. Secondly, measurement of the diffraction pattern, even if it could be resolved, would not be accurate enough since the optical fiber is at least one order of magnitude smaller in diameter. Finally, and perhaps most important of all, an optical fiber typically comprises an inner core of a first refractive index and a thin outer cladding of a different refractive index. The measurement techniques disclosed by Kreugle, even if they could be applied to fiber optics, are incapable of measuring the thickness of the cladding layer and the core, or the relative refractive indices thereof, and at best, could merely measure the gross, overall diameter of the clad cable.

It is, however, known that a portion of a scattering pattern generated by a laser beam impinging on a transparent fiber can be used for measuring the diameter of the fiber. In this portion of the scattering pattern, interference between light reflected from the fiber and light refracted by the fiber causes fringes to appear. The distance between minima of the fringes is related to the diameter of the fiber. See "Interference Phenomena on Thin, Transparent Glass Filaments under Coherent Lighting," by Von Josef Gebhart and Siegfried Schmidt, *Zeitschrift fur angewandte Physik*, XIX. Band, Heft 2–1965.

The latter method is not shown to extend to clad fibers, however. It is desired to meaasure both the core diameter and the cladding diameter of clad fibers.

SUMMARY OF THE INVENTION

These and other problems have been solved by the methods of the invention, in which the outer diameter of an optical fiber is measured; the optical fiber having an inner core and an outer cladding, and the outer cladding having a known refractive index.

According to the invention, a beam of coherent, monochromatic radiation is directed at the fiber to generate a far-field scattering pattern, a particular portion of which results from radiation reflected from the outer surface of the fiber and radiation passing through and being refracted predominantly by the outer cladding. The number of fringes, N, is counted between a lower scattering angle $\theta_1$ and an upper scattering angle $\theta_2$ in the particular portion of the scattering pattern. The outer diameter of the fiber is then calculated from the relation $$d = N\lambda/[E(\theta_2) - E(\theta_1)]$$

where $$E(\theta_1) = \sin(\theta_1/2) + \sqrt{m_1^2 + 1 - 2m_1 \cos(\theta_1/2)}$$
$$E(\theta_2) = \sin(\theta_2/2) + \sqrt{m_1^2 + 1 - 2m_1 \cos(\theta_2/2)}$$

$m$ = the refractive index of the cladding, and
$\lambda$ = the wavelength of the radiation.

Methods are also disclosed for measuring changes in the outer diameter of a continuously advancing fiber, and for measuring the ratio of the core diameter to the outer diameter of the fiber so that the core diameter can be calculated given the outer diameter.

These and other aspects of the invention will become apparent from the accompanying drawings and detailed description.

DESCRIPTION OF THE DRAWINGS

FIG. 3 is a graph which compares the predicted results of Lundberg with the core index equal to the cladding index, i.e., for an unclad fiber;

FIG. 4 is a cross-sectional view of an unclad fiber which is useful in deriving mathematical relations used herein;

FIG. 5 is a graph which compares the actual and predicted scattering patterns of the fiber over a selected angle range for polarization parallel to the fiber;

FIG. 8 is a graph showing the scattering pattern of a fiber when perpendicularly polarized light is used to generate the pattern;

FIG. 10 is a graph depicting the forward scattering pattern of a noncircular unclad fiber;

FIG. 11 is a graph showing the predicted backward scattering pattern of an unclad fiber;

FIG. 16 is a graph showing the number of fringes present in the scattering pattern as a function of angle;

FIGS. 19–22 are graphs comparing the actual and predicted scattering patterns of a clad fiber, over three distinct angle ranges;

DETAILED DESCRIPTION OF THE INVENTION

Figure 1:
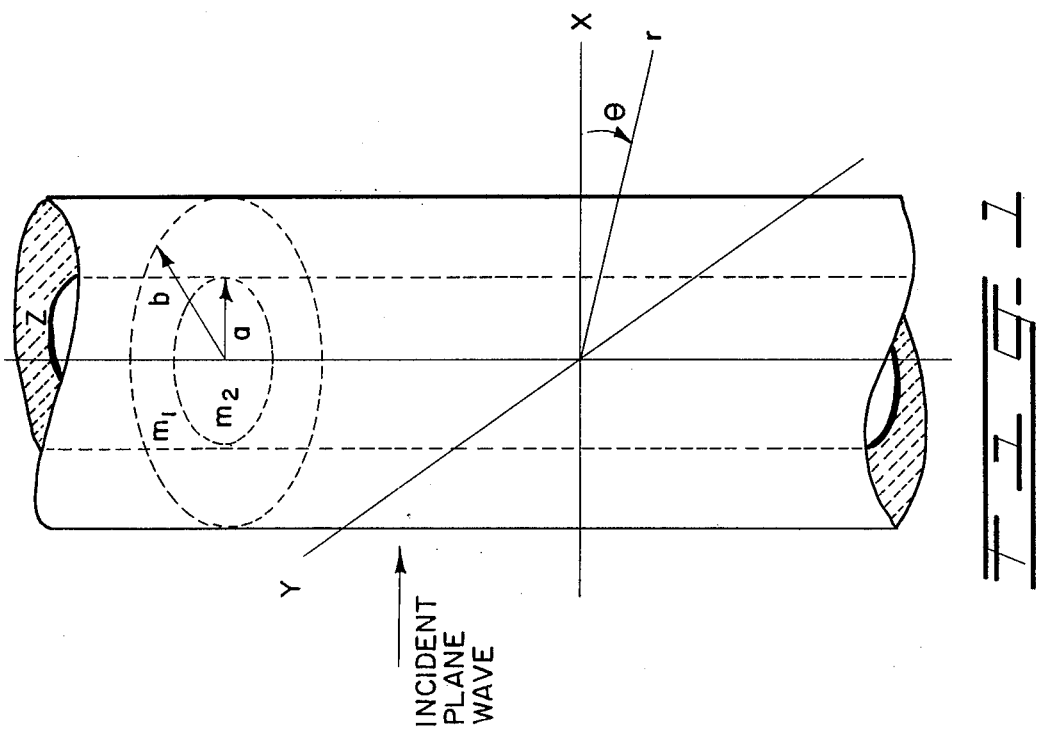
FIG. 1 is an isometric view of a typical clad optical fiber.

Referring to FIG. 1, if a collimated, single transverse mode beam of radiant energy, or example, a laser beam, is directed at a transparent fiber, perpendicular to its axis, light is scattered in a plane which is perpendicular to the fiber axis. The intensity of the light scattered, as a function of the angle measured from the forward direction of the original beam, is characteristic of the size of the fiber and its refractive index, and, in the case of a clad fiber, the core diameter and its index of refraction as well.

As will be shown below, calculations have been performed to determine the theoretical characteristics of the scattered light and the relationship of these characteristics to the four parameters of core and cladding diameters and refractive indices. The results which were obtained using precise wave theory, as well as those from a more simplified geometrical ray analysis, will be described. The validity of these results has been confirmed by comparison with experimentally measured light scattering patterns obtained by the use of a $0.633\mu m$ wavelength HeNe laser. In accordance with the invention, the scattering patterns so obtained may be used to measure critical fiber parameters, as will be more fully discussed below.

FIG. 1 is a diagram of an illustrative fiber and the coordinate axes which will be used throughout this specification. The axis of the fiber is in the $z$ direction, and the incident plane monochromatic wave, for example, an HeNe laser beam, is directed along the $x$ axis, in the positive-going direction. Cylindrical coordinates are used to describe the scattered light with $r$ being the distance from the $z$ axis of the fiber and $\theta$ the angle from the $x$ axis of the fiber. Therefore, as to any point in the $xy$ plane, $$x = r \cos\theta, \text{ and, } y = r \sin\theta.$$

In this explanation, the incident light is assumed to be of constant amplitude, that is to say, the amplitude of the light does not fall off towards the edge of the field. This assumption is valid for typical optical fibers of $200\mu m$ diameter or less and laser beams of typically 2 mm diameter. Now, for light scattered in the forward direction, $\theta = 0^{20}$ · and for light scattered in the backward direction, $\theta = 180°$. The radius of the fiber core is $a$, and the core has a refractive index $m_2$; the radius of the total fiber is $b$ with the cladding layer having an index of refraction $m_1$. Thus, the cladding layer has a thickness $c = (b - a)$.

The solution of equations descriptive of the scattering of electromagnetic waves by a clad optical fiber made of nonabsorbing material has been reported by M. Kerker and E. Matijevic in the *Journal of the Optical Society of America*, Vol. 51 (1961) pg. 506, who jointly extended the theory described by H. C. VanDerHulst in, *Light Scattering from Small Particles*, John Wiley and Sons, New York (1951), which theory covered scattering from dielectric cylinders (i.e., unclad optical fibers). The solution is derived by forming appropriate solutions of the scalar wave equation for three reqions: (1) in the fiber core; (2) in the cladding; and (3) outside the fiber. This is done separately for each of the two polarizations: (a) parallel to the fiber axis; and (b) perpendicular to the fiber axis. The solutions are given below for the case of electric-field polarization which is parallel to the fiber axis.

$$(R>b) \quad U = \sum_{n=-\infty}^{\infty} F_n\{J_n(kr) - {}_n^0H_n(kr)\} \quad (1)$$

$$(b>r>a) \quad u = \sum_{N=-\infty}^{\infty} F_n\{B_n{}^1J_n(m_1kr) - b_n{}^1H_n(m_1kr)\} \quad (2)$$

$$(r<a) \quad u = \sum_{N=-\infty}^{\infty} F_n\{B_n{}^2J(m_2kr)\} \quad (3)$$

where $u$ is the resulting field amplitude at $r$, $\theta$; $k = 2\pi/\lambda$, $\lambda$ is the wavelength of the radiation, $J_n$ is the Bessel function of the first kind, $H_n$ is the Hankel function of the second kind and $b_n{}^0$, $B_n{}^1$, $b_n{}^1$, $B_n{}^2$ are complex coefficients.

In Equation (1) the first term represents the incident wave and the second term the scattered wave. The incident wave is a plane wave expressed in the form $$\psi = e^{iwt - ikx} = \sum_{n=-\infty}^{\infty} F_n J_n(kr) \quad (4)$$

where $$F_n = (-1)^n e^{in\theta} + {\rm iwt}.$$

The complex coefficient $b_n^0$ is found by using the boundary conditions that $mu$ and $m\delta u/\delta_r$ are to be continuous at the core/cladding and cladding/air interfaces. This leads to a set of four equations from which the coefficient is found:

$$b_n^o = \frac{\begin{vmatrix} J_n(\alpha_1) & H_n(m_1\alpha_1) & J_n(m_1\alpha_1) & 0 \\ J_n'(\alpha_1) & m_1H_n'(m_1\alpha_1) & m_1J_n'(m_1\alpha_1) & 0 \\ 0 & H_n(m_1\alpha_2) & J_n(m_1\alpha_2) & J_n(m_2\alpha_2) \\ 0 & m_1H_n'(m_1\alpha_2) & m_1J_n(m_1\alpha_2) & m_2J_n'(m_2\alpha_2) \end{vmatrix}}{\begin{vmatrix} H_n(\alpha_1) & H_n(m_1\alpha_1) & J_n(m_1\alpha_1) & 0 \\ H_n'(\alpha_1) & m_1H_n'(m_1\alpha_1) & m_1J_n'(_{im1}\alpha_1) & 0 \\ 0 & H_n(m_1\alpha_2) & J_n(m_1\alpha_2) & J_n(m_2\alpha_2) \\ 0 & m_1H_n'(m_1\alpha_2) & m_1J_n'(m_1\alpha_2) & m_2J_n'(m_2\alpha_2) \end{vmatrix}} \quad (5)$$

where $\alpha_1 = kb$ and $\alpha_2 = ka$.

The scattered light intensity is given by the second term in Equation (1). Since the scattered light is to be observed at some distance from the fiber, the asymptotic expression for $H_n(kr)$ can be used. The intensity for the scattered light is thus $I_p$ $$I_p = \left| \frac{2}{\pi kr} e^{(-ikr + iwt - i3\pi/4)} \sum_{n=-\infty}^{\infty} b_n^o e^{in\theta} \right|^2$$

$$= \frac{\lambda}{\pi r} \left| b_0^o + 2 \sum_{n=1}^{\infty} b_n^o \cos(n\theta) \right|^2. \quad (6)$$

since $b_{-n}^o = b_n^o$.

Similar results can be found for the light scattered when the incident radiation is polarized perpendicular to fiber axis, but these are not given here for brevity.

Of course, Equation (6) may be solved manually, but in view of the large number of points which must be plotted to obtain a useful scattering pattern, a manual solution is tedious. Accordingly, I found it preferable to employ a computer to perform the repetitive calculations necessary to solve Equation (6).

Figure 2:
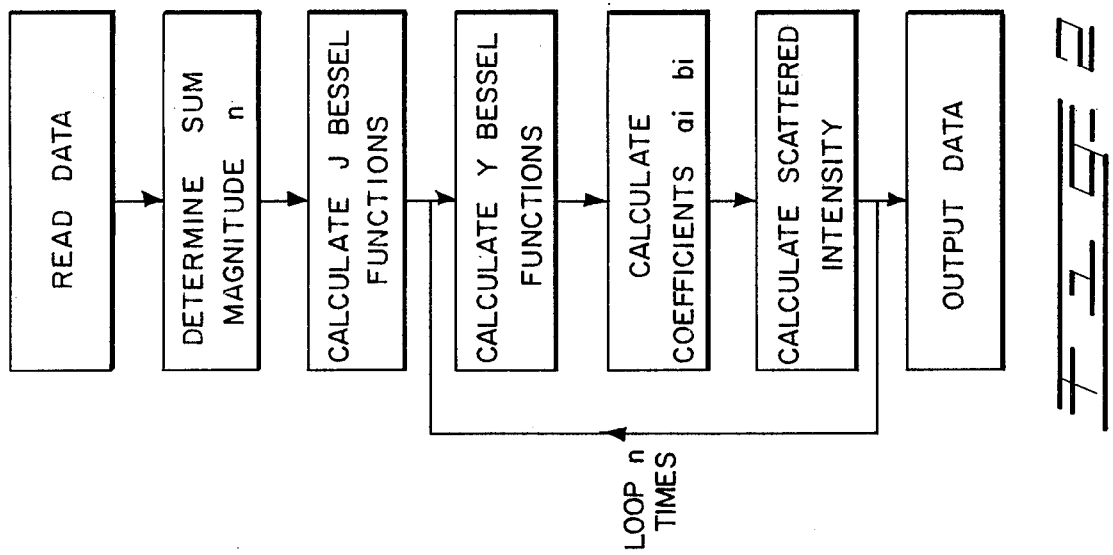
FIG. 2 is a flow chart useful in calculating the scattering pattern of the fiber shown in FIG. 1.

FIG. 2 shows the flow diagram which I employed to calculate the scattering intensity from Equation (6). It must be emphasized that this flow chart is trivial and forms no part of the invention; neither does the computer program which was written to implement this flow chart, which program is entirely routine, and well within the skill of any competent programmer.

Some interesting scaling problems were experienced in solving Equation (6) in this manner, and these will now be discussed, for the sake of completeness. In practice, the terms in Equation (6) tens to become zero for large values of $n$. It was found that in order to achieve this result, which greatly simplifies the mathematics, the number of terms, $n$, had to be greater than 40 for small diameter fibers and greater than $1.2\ m_1 b 2\pi/\lambda$ for larger diameter fibers. This conclusion was checked by simply calculating the contribution made to the diffraction pattern by the last 10 percent of the terms in Equation (6) and then keeping this contribution at a figure of less than $10^{-7}$. The J Bessel functions were then calculated using the downward recursion formula:

$$\gamma J_{l-1}(\alpha) = 2n\gamma/\alpha J_l(\alpha) - \gamma J_{l+1}(\alpha). \quad (7)$$

An arbitrarily small value of $10^{-30}$ was used for $\gamma J_l$ and $l$ was made sufficiently large, by trial and error, until repeatable results were obtained. For small arguments ($\alpha < 100$), $l$ was made $2.8\ n + 11$, as suggested by Lundberg. For large $\alpha$, $l$ was stated at $1.2\ n$. After recurring down to $\gamma J_0$, the proportional constant $\gamma$ was found from the sum:

$$J_0(\alpha) + 2 \sum_{p=1}^{\infty} J_{2p}(\alpha) = 1 \quad (8)$$

The values of $J_0$ up to an argument $\alpha = 50$ were confirmed by checking them against results published in standard Bessel Function Tables. For large values of $l$ it was found that during recurrence, $\gamma J$ attained very large values exceeding the range of the computer. I, thus, found it necessary to use a scaling factor to keep the value within range. It was necessary to keep track of this scaling factor since the values of $J$ for large $l$ might contribute a significant amount to the later computations even though their values were exceedingly small.

Finally, the values of $J$ were returned to the main program in logarithmic form. This was found to be the easiest way to handle the large range of numbers. The sign was carried in a separate function.

The Hankel function $H_n$ is given by:

$$H_n = J_n - iY_n \quad (9)$$

where $Y_n$ is the Bessel function of the second kind. $Y_o$ was calculated by the asymptotic expansion:

$$Y_o(\alpha) = \left(\frac{2}{\alpha\pi}\right)^{1/2} \left[ \sin\left(\alpha - \frac{\pi}{4}\right) \left\{ 1 - \frac{(-1)(-9)}{2!(8\alpha)^2} + \frac{(-1)(-9)(-25)(-49)}{4!(8\alpha)^4} \right\} + \cos\left(\alpha - \frac{\pi}{4}\right) \left\{ \left(\frac{-1}{8\alpha}\right) - \frac{(-1)(-9)(-25)}{3!(8\alpha)^3} + \right\} \right] \quad (10)$$

Subsequent values of $Y_l$ were calculated using the Wronskian relation, which is reported to yield slightly more accurate results than are obtained by using upward recurrence. This relationship is:

$$J_l(\alpha) Y_{l+1}(\alpha) - J_{l+1}(\alpha) Y_l(\alpha) = -2/\alpha\pi. \quad (11)$$

Derivatives for both $J$ and $Y$ were calculated from the equation:

$$C_l'(\alpha) = C_{l+1}(\alpha) - l/\alpha\ C_l(\alpha). \quad (12)$$

Again, all the values were returned to the main program in logarithmic form since $Y_l$ attains very large values for large $l$.

The individual terms of the numerator and denominator determinants were also computed in logarithmic form. They were then converted to standard form with a common scaling factor and the determinants calculated. After the final division to obtain $b_n$ or $a_n$, the scaling was removed to give the final value. In this way, the coefficients were calculated without exceeding the range of the computer or losing terms which contribute significantly to the final result, even though their values at a particular point were very small.

Finally, the scattering functions were calculated using Equation (6). It is interesting to note that to calculate 256 points for a clad optical fiber of 160μ diameter took only 30 minutes on an IBM 360/50 computer, using double precision, which amply justifies the time taken to write the necessary computer program.

By using an arbitrary core size ranging from zero to the total fiber size and by making the refractive index of the core equal to the refractive index of the cladding layer, the program employed also gave results for unclad fibers. This relationship was employed to check the validity and operation of the computer program used. For example, if the core size is varied, no variation in the scattering pattern should occur. Secondly, the results of any computer run may be compared with those published by others, for example Lundberg.

FIG. 3 shows a plot of Lundberg's calculated results for an unclad fiber together with comparable results from the program I employed superimposed thereon. This graph confirms that the program yields the correct results for fiber sizes of about 30μm. It was also found that varying the core size in no was affect the results at all provided that the refractive indices of the core and cladding were maintained at the same value.

In accordance with the invention, I have discovered that there are two distinct regions of significance in the scattering pattern shown in FIG. 3. I have further discovered that these two regions may advantageously be employed in the performance of certain of the measurements to be discussed below.

As shown in FIG. 3, beyond about 7°, the scattering pattern varies in intensity in a sinusoidal fashion as a function of the scattering angle. The period of this variation is relatively constant and, as will be seen later, is inversely related to the fiber diameter.

The behavior of this fringe pattern can be explained in a simple geometric manner by referring to FIG. 4. As shown, there are two paths by which light rays can be bent to a direction $\theta$ from the axis. One path is by reflection from the surface of the fiber, the other is by refraction through the fiber. Interference between these rays, whose path lengths vary with changes in the value of $\theta$, causes the observed fringe pattern. The derivation of the equation which gives the path difference $\Delta$ between the reflected and refracted beams for an unclad fiber is set forth below.

Referring again to FIG. 4, by tracing rays along the wave normals in a beam, it is possible to calculate the path lengths of the waves. The object, therefore, is to trace two rays, that both leave the fiber at an angle $\theta$, one of which is refracted through the fiber and the other of which is reflected from it, as shown in FIG. 4. Since these two rays both leave the fiber at an angle $\theta$, in the far field there will be interference between the two waves represented by these rays. This geometric ray approach has some limitations, two of which must be considered here. As taught by VanDerHulst, one limitation is that the fiber must be large compared to the wavelength of the light. The second is that if rays converge to a focus, a region of infinite energy is produced. Here the geometric approach breaks down, since the waves in this focal region are no longer normal to the geometric rays. VanDerHulst states that if the rays pass through a focal line, such as F, in FIG. 4, then the phase of that ray must be advanced by $\pi/2$ radians which is equivalent to shortening the path length by a quarter wave ($\pi/4$).

The ray incidence angle $\alpha$ is given by Snell's law for a particular scattering angle $\theta$, by the equation:

$$\sin \alpha = m \sin (\alpha - \theta/2) \qquad (13)$$

where $m$ is the index of refraction. This can be rewritten in the following way, which will be more convenient for use in later calculations.

$$\tan 6\theta = m \sin (\theta/2)/[m \cos (\theta/2) - 1] \qquad (14)$$

The optical path length of the refracted ray is $p - \lambda/4$ where $$p = 2 \, mb \cos (\alpha - \theta/2) \qquad (15)$$

$b$ is the fiber radius, and
$\lambda$ is the wavelength of the light.
The $\lambda/4$ term is included since this ray passes through a focal line. The optical path of the reflected ray to the same relative positions is $2u + \lambda/2$ where:

$$u = b \cos \alpha - b \sin (\theta/2) \qquad (16)$$

and the term λ12 is included to account to reflection. Thus, the optical path difference, $\Delta$, between the reflected and refracted ray is given by:

$$\Delta = p - 2u + \lambda/4 \qquad (17)/4$$

Substituting equations (15) and (16) into equation (17):

$$\Delta = 2[mb \cos [\alpha - (\theta/2)] - b \cos \alpha + b \sin (\theta/2)] + \lambda/4 \qquad (18)$$

Using trigonometric relationships between $\alpha$ and $\theta$ derived from equation (14), equation (18) can be rewritten $$\Delta = d [\sin (\theta/2) + \sqrt{m^2 + 1 - 2m \cos (\theta/2)}] + \lambda/4 \qquad (19)$$

where $d = 2b$ is the diameter of the fiber.

The path-length difference $\Delta$ varies as a function of scattering angle $\theta$ and fiber diameter $d$. At a given scattering angle $\theta$, if $\Delta$ is an integral number of wavelengths of the incident beam, the corresponding reflected and refracted waves interfere to produce a maximum in the scattering pattern. Conversely, if $\Delta$ is an integral number of wavelengths minus a half wavelength of the incident beam, the corresponding waves interfere to produce a minimum in the scattering pattern. Thus, if a change in $\theta$ results in a change in $\Delta$ of one wavelength, that change in $\theta$ will encompass one fringe in the scattering pattern.

The change in $\Delta$ as $\theta$ is varied between a lower scattering angle $\theta_1$ and an upper scattering angle $\theta_2$ can be measured by counting the number of fringes in the scattering pattern between these angles and multiplying by the wavelength λ of the incident light. Thus, $$N\lambda = \Delta(\theta_1) - \Delta(\theta_2) = d[E(\theta_2)] - d[E(\theta_1)] \quad (20)$$

where $E(\theta_1) = \sin(\theta_1/2) + \sqrt{m^2 + 1 - 2m\cos(\theta_1/2)}$
and $$E(\theta_2) = \sin(\theta_2/2 /2) \sqrt{m^2 + 1 - 2m\cos(\theta_2/2)}$$

Equation (20) can be rearranged as $$d = N\lambda/[E(\theta_2) - E(\theta_1)] \quad (21)$$

to express fiber diameter $d$ as a function of the number of fringes $N$. Of course, as used throughout this specification, and in the claims, the expression "counting the number of fringes" includes counting fractional parts thereof and is not restricted to an integral number of fringes.

Now, angle $\alpha$ is the incidence angle of the refracted ray. This has a maximum value of $\pi/2$ which establishes an upper limit on the validity of equation (2). It can be shown using equation (14) that this limit can be expressed in terms of upper scattering angle $\theta_2$. The condition is:

$$m \cos \theta_2/2 \geq 1 \quad (22)$$

which can also be written $$\theta_2 \leq 2 \cos^{-1}(1/m) \quad (23)$$

Figure 6:
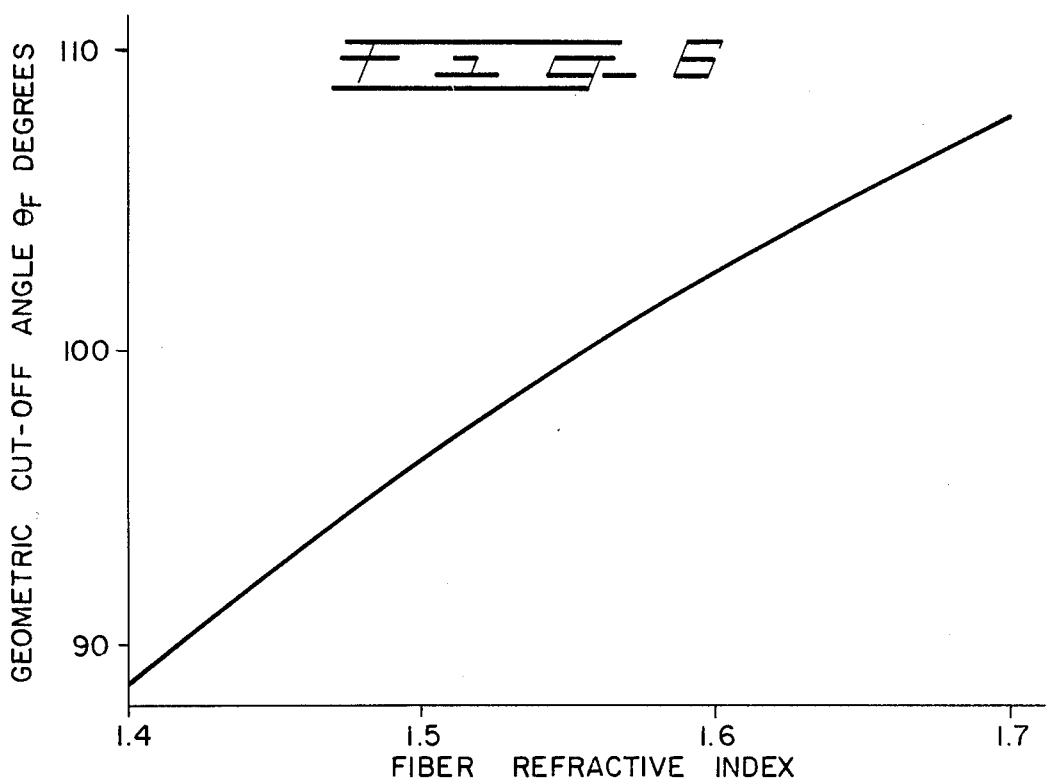
FIG. 6 is a graph showing the manner in which the geometric cut-off angle of the fiber varies as a function of fiber refractive index.
Figure 7:
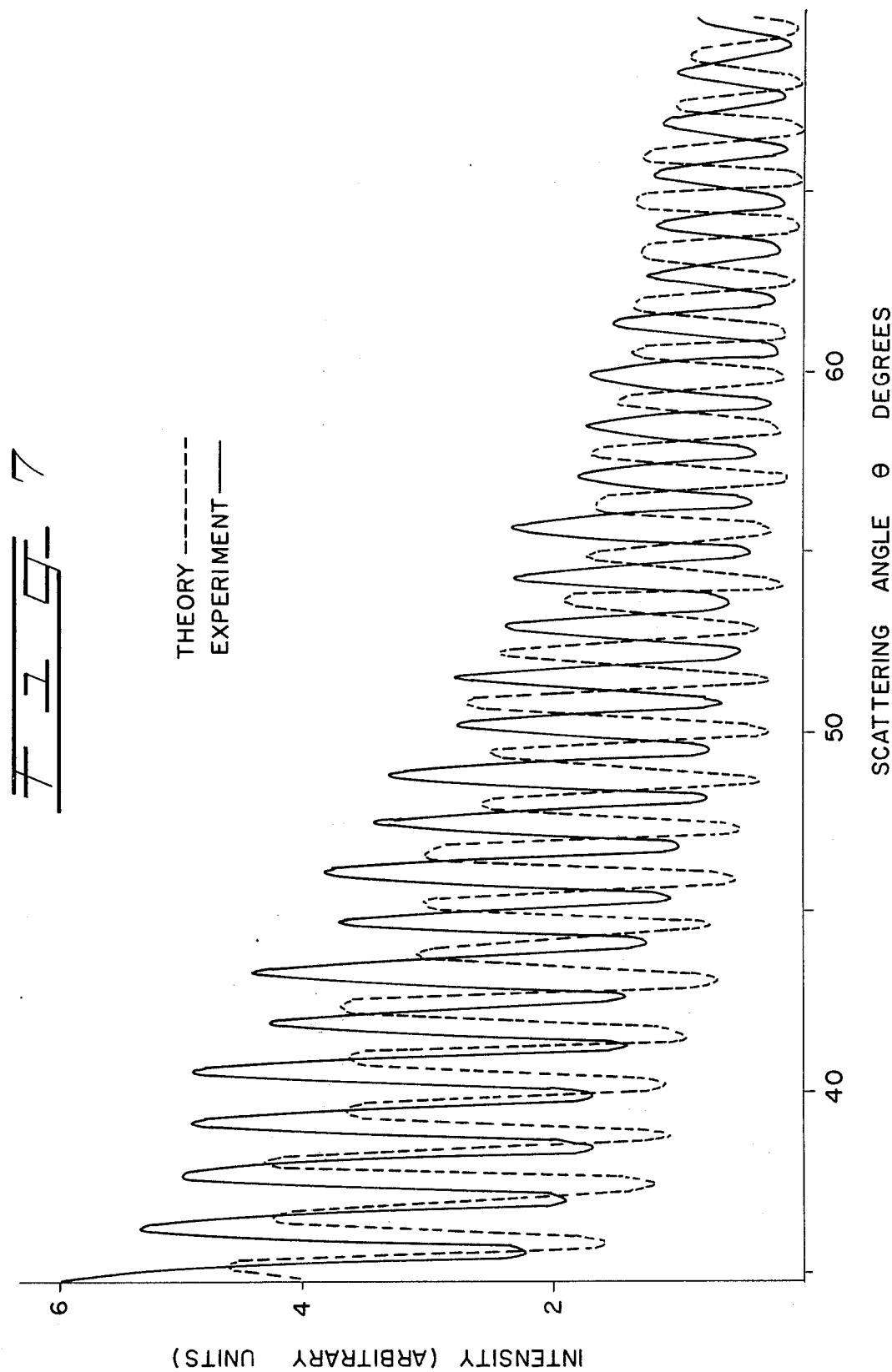
FIG. 7 is a graph similar to that shown in FIG. 5 but for another angle range.

Thus for a scattering angle greater than the maximum given by Equation (23), the fringe pattern should disappear. For a quartz, unclad fiber, this cut-off angle, which I call $\theta_F$, should be $\theta_F=93.3°$; for a glass fiber of index 1.52, $\theta_F = 97.6°$, and for a glass fiber of index 1.62, $\theta_F = 103.8°$. For fiber diameter measurements, then, it is necessary that:
$\theta_2 < \theta F$ FIG. 5 shows an experimentally measured scattering pattern, together with a best fit theoretical pattern, for the scattering angle range of 70°–105°, for a 29μm unclad, fused silica fiber with light polarized parallel to the fiber axis. The discrepancies between the theoretical and experimental patterns will be discussed later. What is apparent, however, is that although the fringe pattern does fade out, it has a gradual decay without a sharp discontinuity and so could not be used to accurately determine the refractive index of a fiber. FIG. 6 is a plot of the cut-off angle $\theta_F$ vs. refractive index and shows the quite large variation of cut-off angle $\theta_F$ with refractive index. FIG. 7 is a scattering pattern similar to that shown in FIG. 5, except that it is for the scattering range of 35°–105°.

The best fit theoretical patterns shown in FIGS. 5 and 7 were found by matching as closely as possible the positions of the maxima and minima of the patterns over the 35°–105° range. The intensity comparison is somewhat arbitrary and was made equal at the maximum, which occurred at approximately 74°. Thus, absolute comparisons between intensity should not be made; just comparisons between their variations in intensity.

As previously mentioned, discrepancies between the theoretical and the experimental patterns in FIG. 5 were noted. It is believed that these are most probably due to the particular fused silica fiber sample which was employed for the experiment, which upon later examination, was found not to be perfectly circular in cross-section. The effect of this non-circularity is to give a variation in intensity of the maxima and also to give small deviations of the fringe position with respect to angle. This observation suggested to me a technique for measuring fiber non-circularity. For example, at the given reference angles, $+\theta_R$ and $-\theta_R$, one compares the fringe patterns present in the angle range $\Delta\theta_R$. If the fiber is non-circular, both fringe patterns will be offset to the right (or left). That is to say, one fringe pattern will be closer to the origin ($\theta = 0$) than theory predicts, while the other pattern will be correspondingly further away from the origin. The degree of relative pattern shift is, of course, proportional to the fiber non-circularity, and if the system is calibrated with fibers of known eccentricity, the non-circularity of an unknown fiber may readily be ascertained. For fibers with larger eccentricities, fringe counts on each side of the fiber can also be made.

As discussed, FIG. 7 is a comparison of theory and experiment for the scattered intensity over the angle range 35°–70° for the same fiber used in FIG. 5, again for the case of parallel polarization. The same discrepancies which were noted in FIG. 5 between theory and experiment were found in FIG. 7 and are also believed to be due to the elliptical, non-circular fiber cross-section. However, this latter plot demonstrates the high contrast fringes which may be obtained. Calculations also show that the maxima and minima positions predicted by Equation (18) are correct over the angle range from ~7° to $\theta_F$.

FIG. 8 shows the theoretical plot for the case of incident light polarized perpendicular to the fiber axis. The same fringes are present; however, the contrast is considerably less and even approaches zero at one angle. This lower fringe contrast was confirmed in the experimentally derived scattering patterns. Thus, although perpendicular polarization may be used in any of the measurement techniques disclosed herein, because of the low-fringe contrast which makes accurate measurements difficult, the preferred polarization is parallel to the fiber axis.

Figure 9:
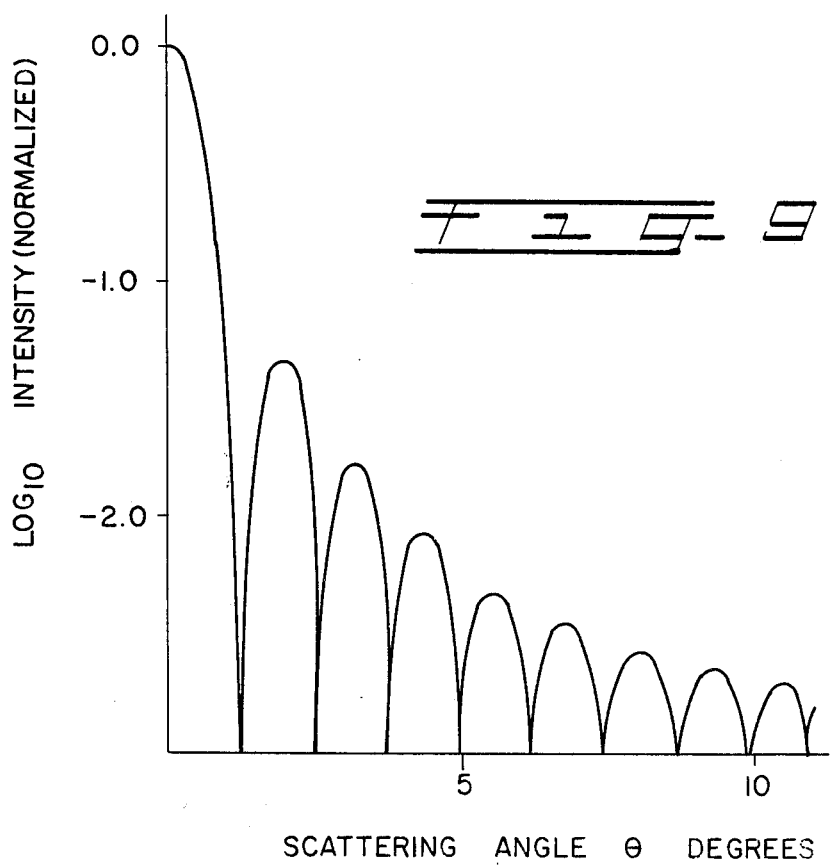
FIG. 9 depicts the classic $\sin^2$ diffraction pattern of an opaque fiber.

For the region $\theta = 0°$ to $\theta = 7°$, there is yet another effect which superimposes itself on the interference effects discussed above, that is, the diffraction of light which is not intercepted by the fiber. If the fiber were opaque then the diffraction pattern in the far field would have an intensity distribution as shown in FIG. 9. This is, of course, the classic $\sin^2$ distribution caused by the bending of the light transmitted at the edge of the opaque object by virtue of the wave properties of light, and is the basis of the prior art opaque filament measuring techniques discussed in the introduction.

Considering a transparent fiber, however, very near to 0°, the interference effect between refracted and reflected light discussed in the previous section disappears. There is still refracted light passing through the fiber; however, at $\theta = 0°$ there is no reflected light. The result is that the scattering pattern near 0° results from interference between the diffracted light and the refracted light. As the angle increases from zero, the pattern results from interfering diffracted, reflected, and refracted light. At progressively larger angles, the contribution from diffraction is reduced until at about 7° only the reflected light and refracted light interfere. The change at 7° is not a constant, but varies with the size of the fiber under examination, and increases with smaller fiber diameters. I have also discovered that the interference effects are dependent on both the diameter of the fiber and its refractive index. The diffraction effects, however, are only a function of the fiber diameter. Thus, if the refractive index of the fiber is known, by measuring the angle at which the diffraction contribution to the overall pattern disappears, and then comparing this angle with the corresponding angle from a fiber of known diameter, one obtains yet another technique for measuring fiber diameter.

FIG. 10 shows the measured forward scattering pattern over the range +10° to −10° for a typical unclad fiber, for example, a 40μm quartz fiber. It will be seen that the pattern is not symmetrical about the zero axis and that the amplitude of corresponding maxima are different; the effect being most noticeable at the lower scattering angles. As previously discussed, the explanation for this effect is believed to be the non-circularity of the fiber cross-section. Eccentricities of up to 0.05μm were measured in the experimental sample actually used to generate FIG. 10. An explanation of this phenomenon is that the refracted rays for the two sides of the scattering pattern have a small difference in phase induced therein because of the non-circular cross-section. This results in different amplitudes in the lobes of the forward angle where the interference between the refracted ray and the diffraction pattern occurs. The technique for measuring fiber non-circularity, discussed above, utilizes to good advantage the asymmetrical nature of the scattering pattern but does not directly utilize the observed differences in corresponding fringe maxima.

The immediately preceding discussion, it will be recalled, dealt with scattering in the range $\theta = 0$ to $\pm 10°$. FIG. 11, on the other hand, shows the theoretical scattered intensity (derived from wave theory) for a typical unclad quartz fiber of 35μm diameter for the scattering angle range of 140°–175°, that is to say, in a direction which is almost directly towards the source. It will be noted, that there is a definite cut-off in the scattered intensity at about 152.5°, as predicted by geometric ray trace theory for parallel polarization. It was also found that this cut-off angle depends only on the refractive index of the fiber, in agreement with theory. It will be noted also that there is a fringe structure of sorts about 150°, however, there is also a finer fringe structure superimposed thereon which makes these fringes indistinct. A proposal has been made to use these fringes as a method of measuring the fiber diameter. However, it is apparent from comparing these fringes with those obtained for the forward angle of between 10°–90° that the forward scattering pattern is easier to measure and gives more accurate results.

Figure 12:
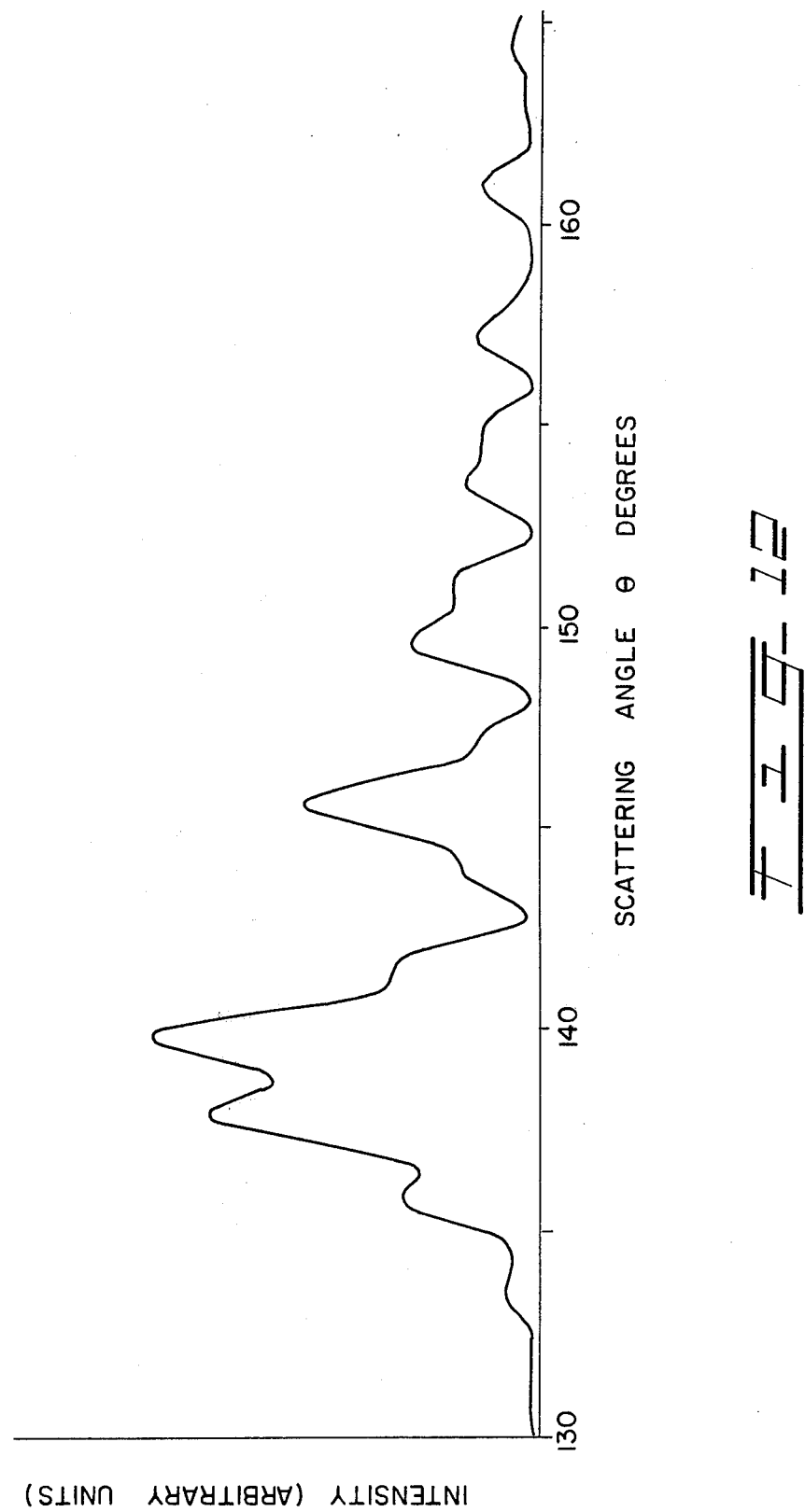
FIG. 12 is a graph showing the actual backward scattering pattern of an unclad fiber not perfectly circular in cross section.

FIG. 12 shows the experimental scattering pattern obtained from an unclad fiber using parallel polarization, over approximately the same scattering angle range used in FIG. 11. The fiber cross-section, however, was not perfectly circular and there was up to a 10 percent difference in orthogonally measured diameters of the sample. The cut-off effect is, nevertheless, quite evident; however, the cut-off angle differs by approximately 15° from that shown in FIG. 11 because of the non-circular cross-section of the fiber. The fine fringe structure previously noted is present to some extent, although the magnitude is less than that predicted by theory.

So far we have been considering only unclad fibers, however, for optical communications purposes, clad fiber is preferred. As one would expect, the forward scattering pattern which is obtained from a clad fiber can also be divided into two regions of interest, (a) 0°–7°, and (b) 10° to about 100°. These two regions will be discussed first and finally the backscattering region beyond approximately 100°.

Figure 13:
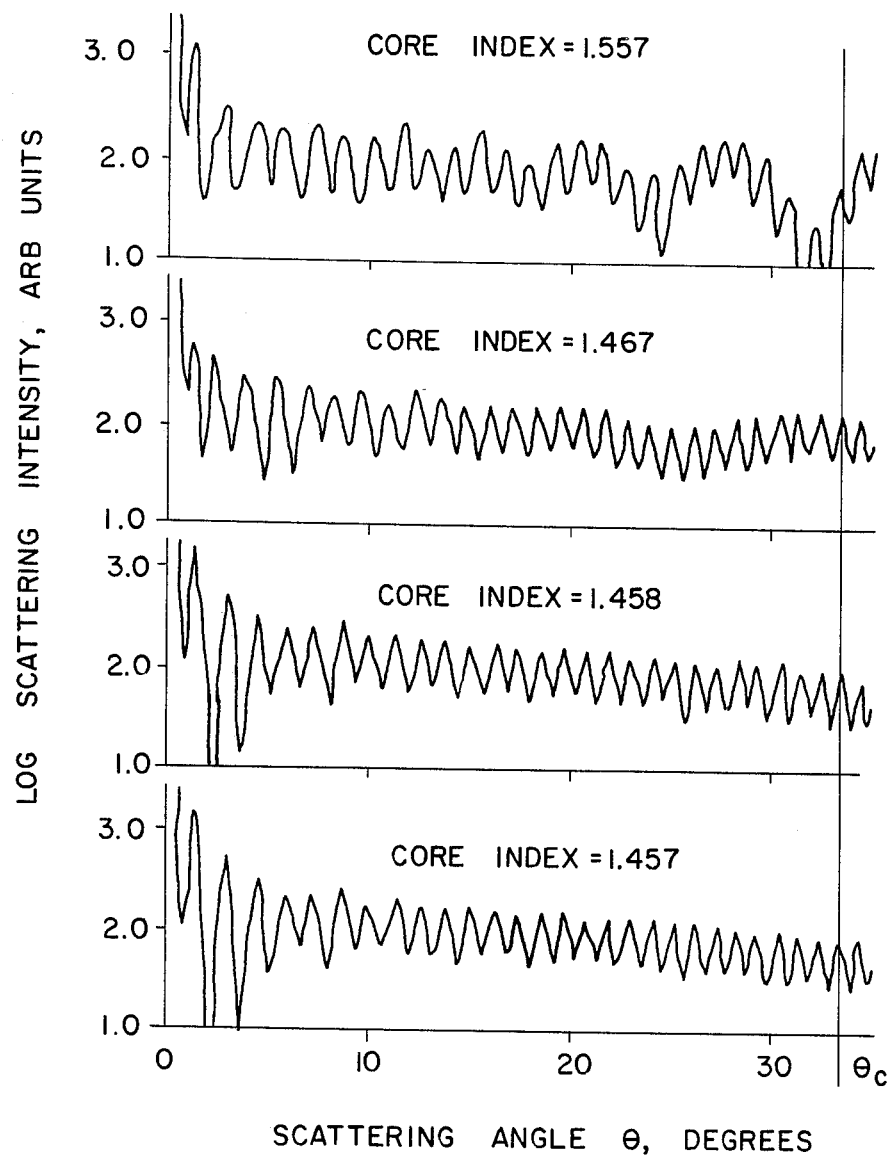
FIGS. 13–15 are graphs depicting the predicted scattering patterns for clad optical fibers of differing refractive index, over three separate angle ranges.
Figure 14:
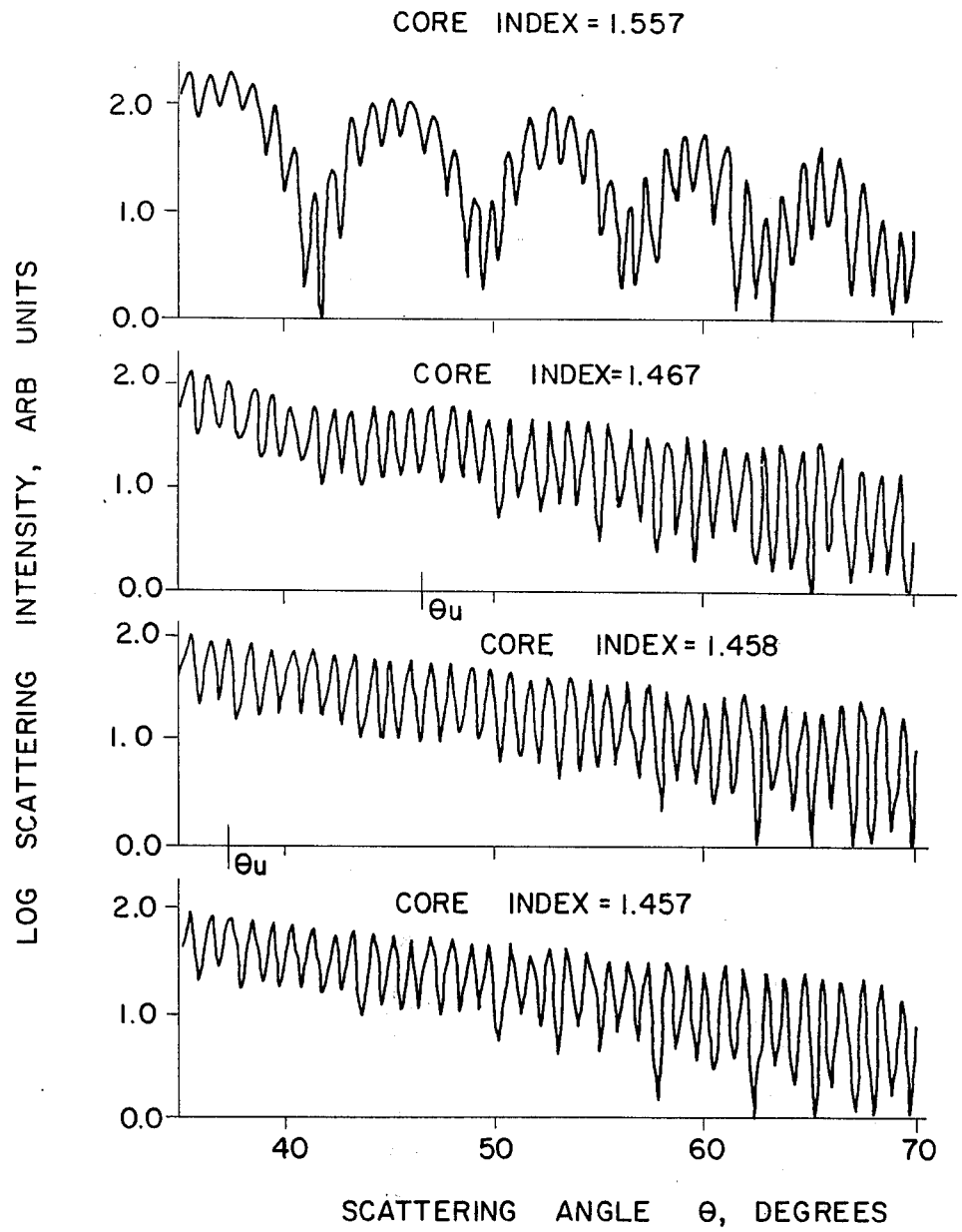
Figure 15:
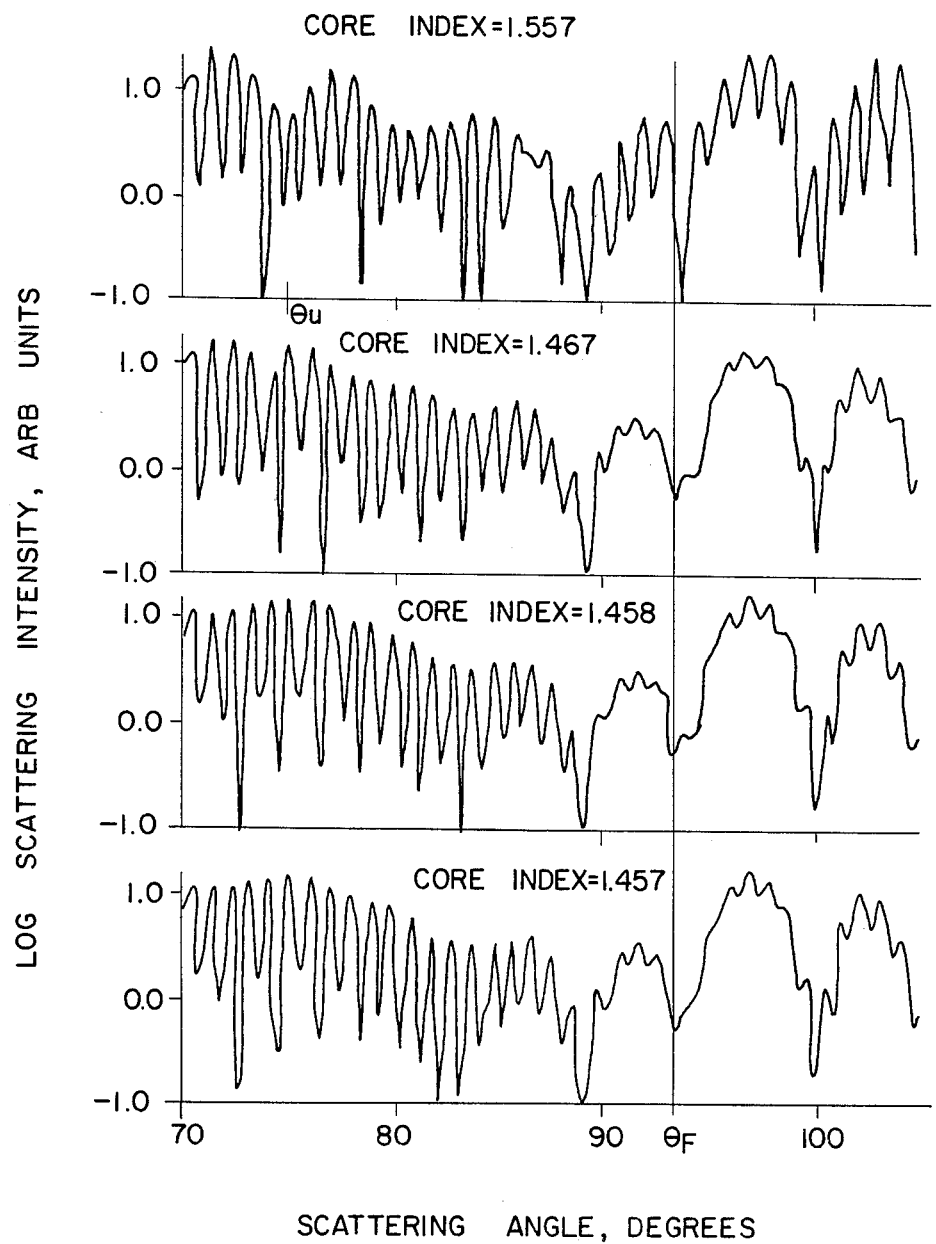

FIGS. 13, 14, and 15, respectively, show the calculated scattering patterns between 0°–35°, 35°–70°, and 70°–105° for a typical clad quartz fiber having an outer diameter of 43.05μm. The core diameter was 20μm and the four graphs within each figure represent different core indices for a fixed cladding index of 1.457. The bottom graph thus represents an unclad fiber for comparison purposes. The graphs shown are for incident beam palarization parallel to the fiber axis, of which is the preferred polarization. As can be seen, the most obvious effect of an increase in core index is the production of a modulation in intensity of the fringe pattern. This modulation is not perceptable with only a 0.001 index difference between the core and cladding but is definitely present with 0.01 index difference and is quite large with the 0.1 index difference. One feature which can be seen in FIGS. 13, 14, and 15 is that the period of the modulation (as a function of scattering angle $\theta$) varies with the difference in index difference. In addition, further experiments have demonstrated that the angular position $\theta_C$ of the beginning of this modulation increases with increases in the core-to-fiber diameter ratio. These observations led me to conceive of a technique wherein the difference between the core and cladding indices could be measured for a fiber of known geometry or, alternatively, how the ratio of the core-to-fiber diameter could be measured for a fiber of known composition. Or, if desired, both measurements could be made simultaneously. In the first case, at a given scattering angle $\theta_R$, the periodicity and angular position of the modulation is measured over the angle range $\Delta\theta_R$, where $\theta_R + \frac{1}{2} \Delta\theta_R < \theta_F$. This periodicity and angular position is then compared to the periodicity and angular position of known fibers of comparable geometry, taken at the same scattering angle. This yields the numeric difference between core and cladding indices; hence, if either is known, the other can be readily calculated. On the other hand, if the indices of the core and cladding are known, but the fiber geometry is not, the value of $\theta_C$ can be used to find the core-to-fiber diameter ratio. Then, if either the core size or overall fiber diameter is known, the other can be calculated. In FIG. 13, $\theta_C$ is shown to be about $\theta = 33°$.

Perhaps, a more important characteristic is shown in FIG. 16. Here, the position of the fringe minima are plotted as a function of angle. Instead of starting at 0°, however, the fringe count is started at about 80.2° for reasons which will become apparent. What happens is that the position of the fringe minima, and the number of fringes as a function of angle, is constant between about 40° and 80°, regardless of variations in the core index. This effect can be derived from geometric ray theory, and is developed in a manner similar to the way the theory was developed for the unclad fiber.

Figure 17:
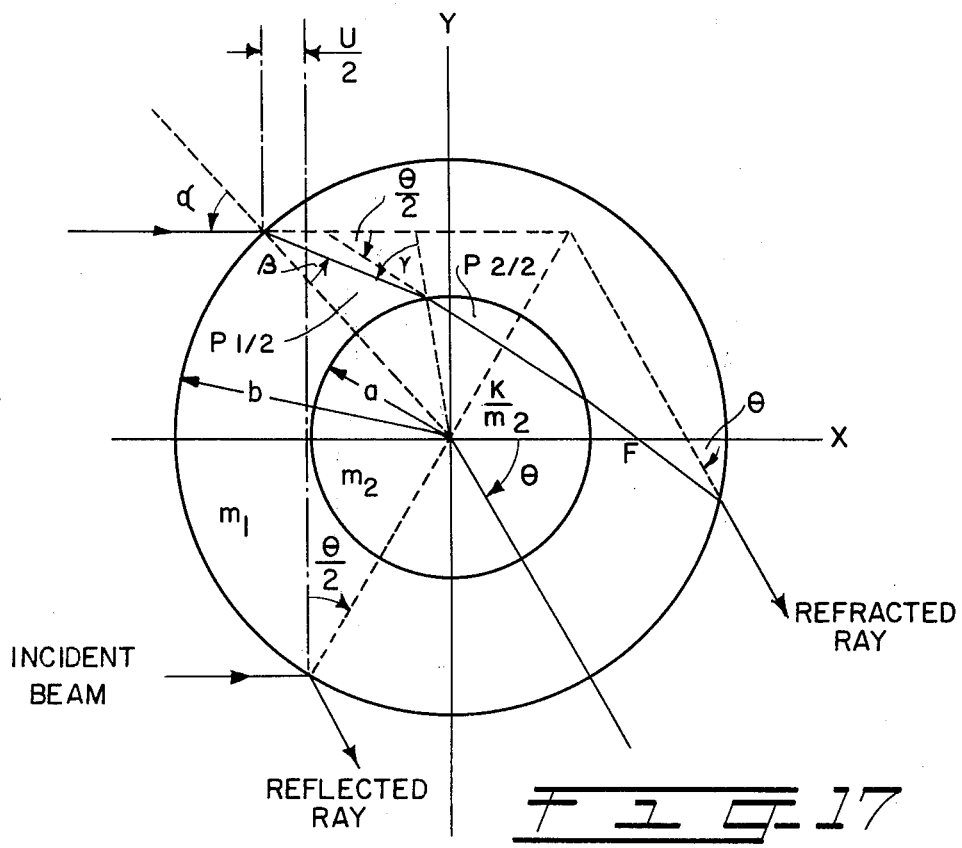
FIG. 17 is a drawing similar to FIG. 4, but for a clad fiber.
Figure 21:
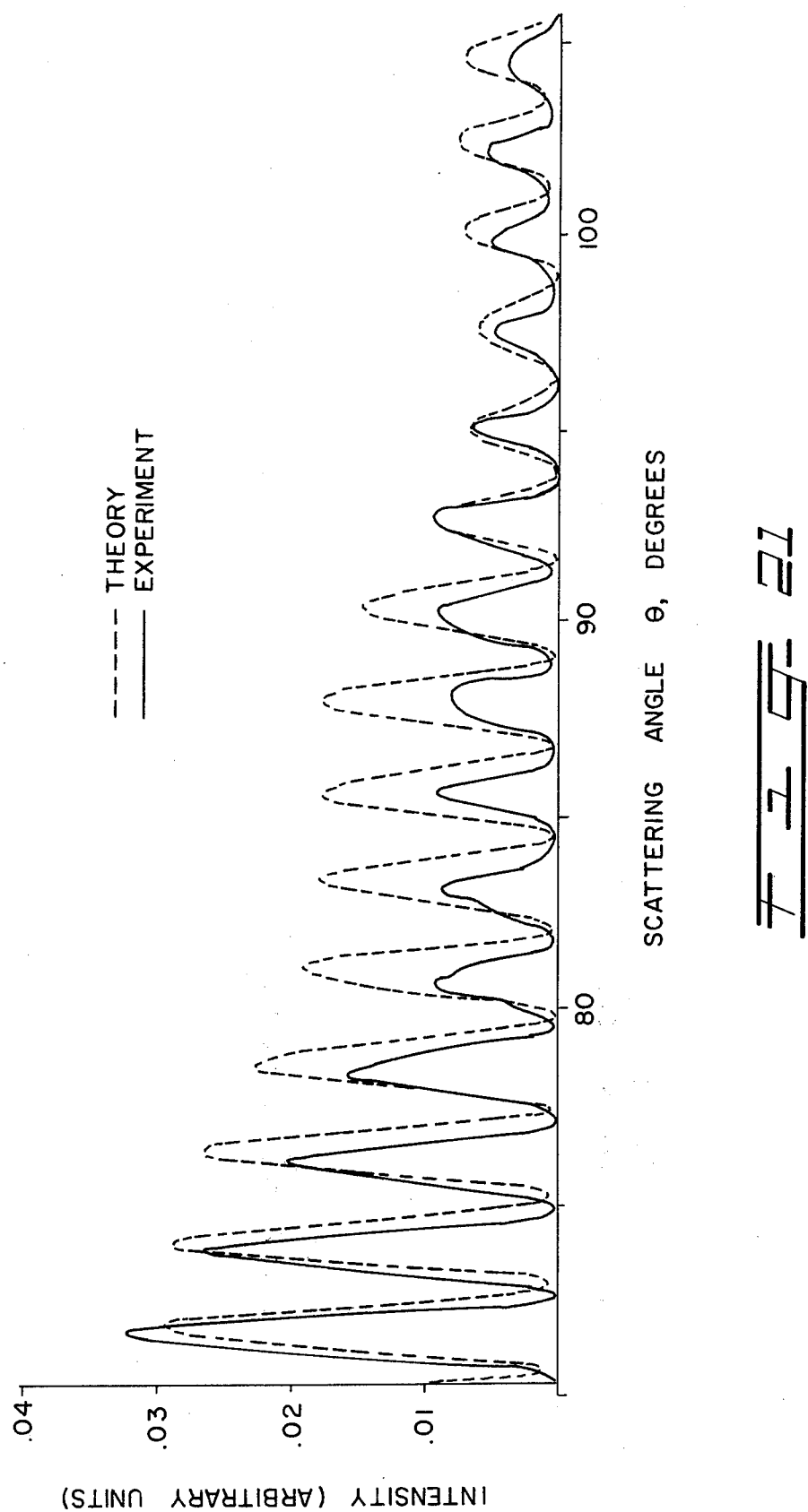
Figure 22:
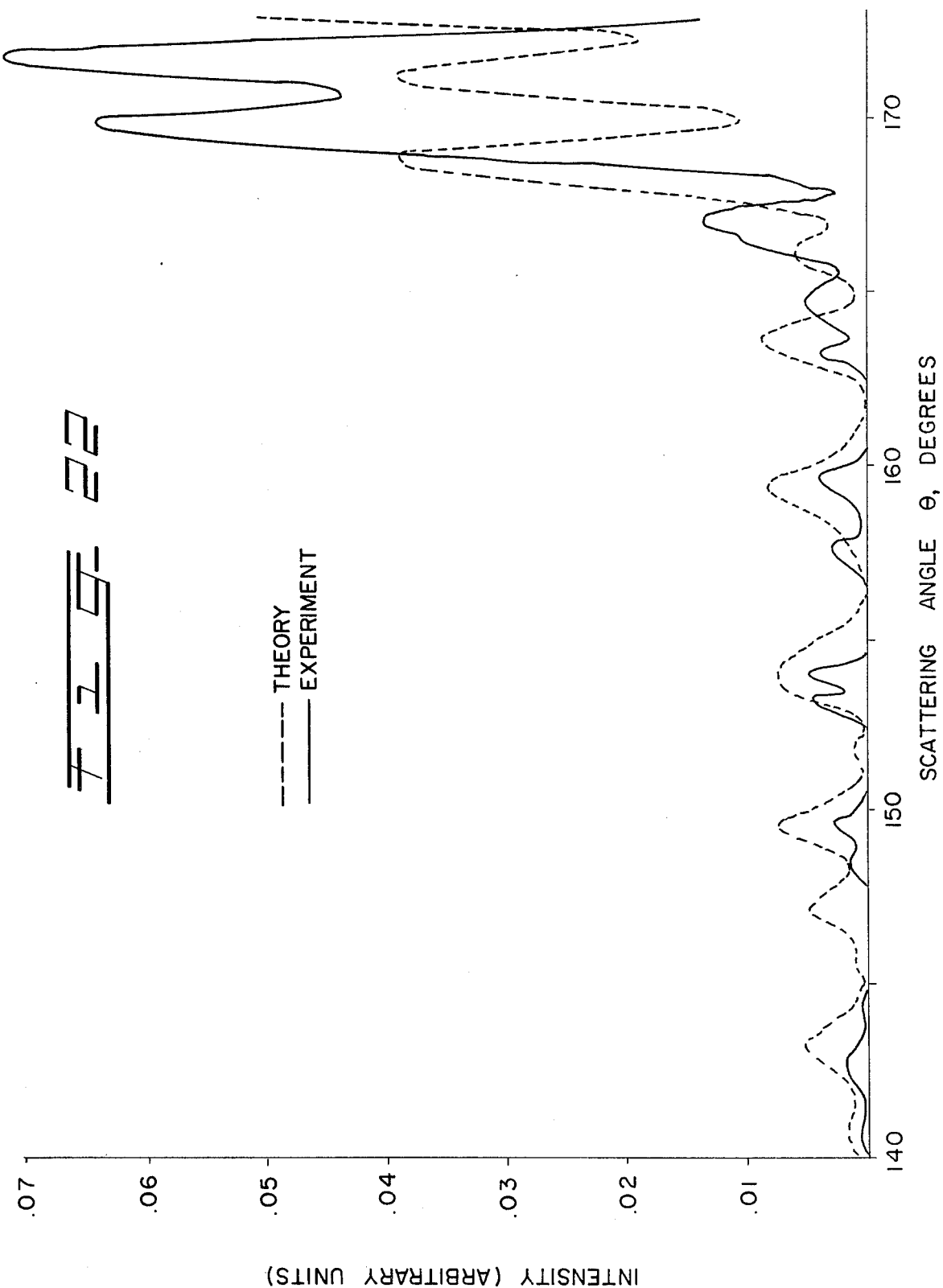
Figure 23:
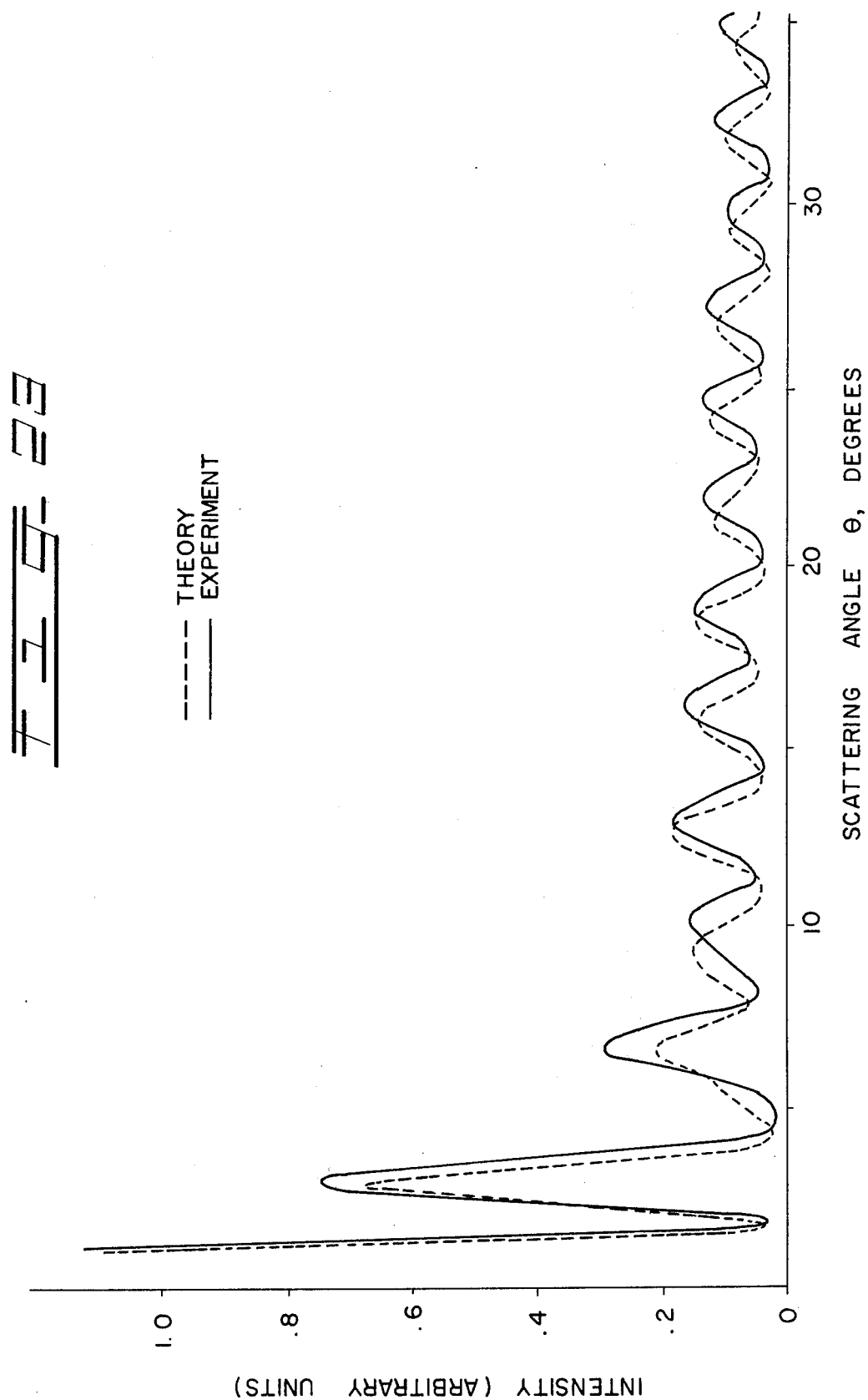
FIGS. 23–26 are graph similar to FIGS. 19–22 for a different fiber over the same angle ranges.
Figure 24:
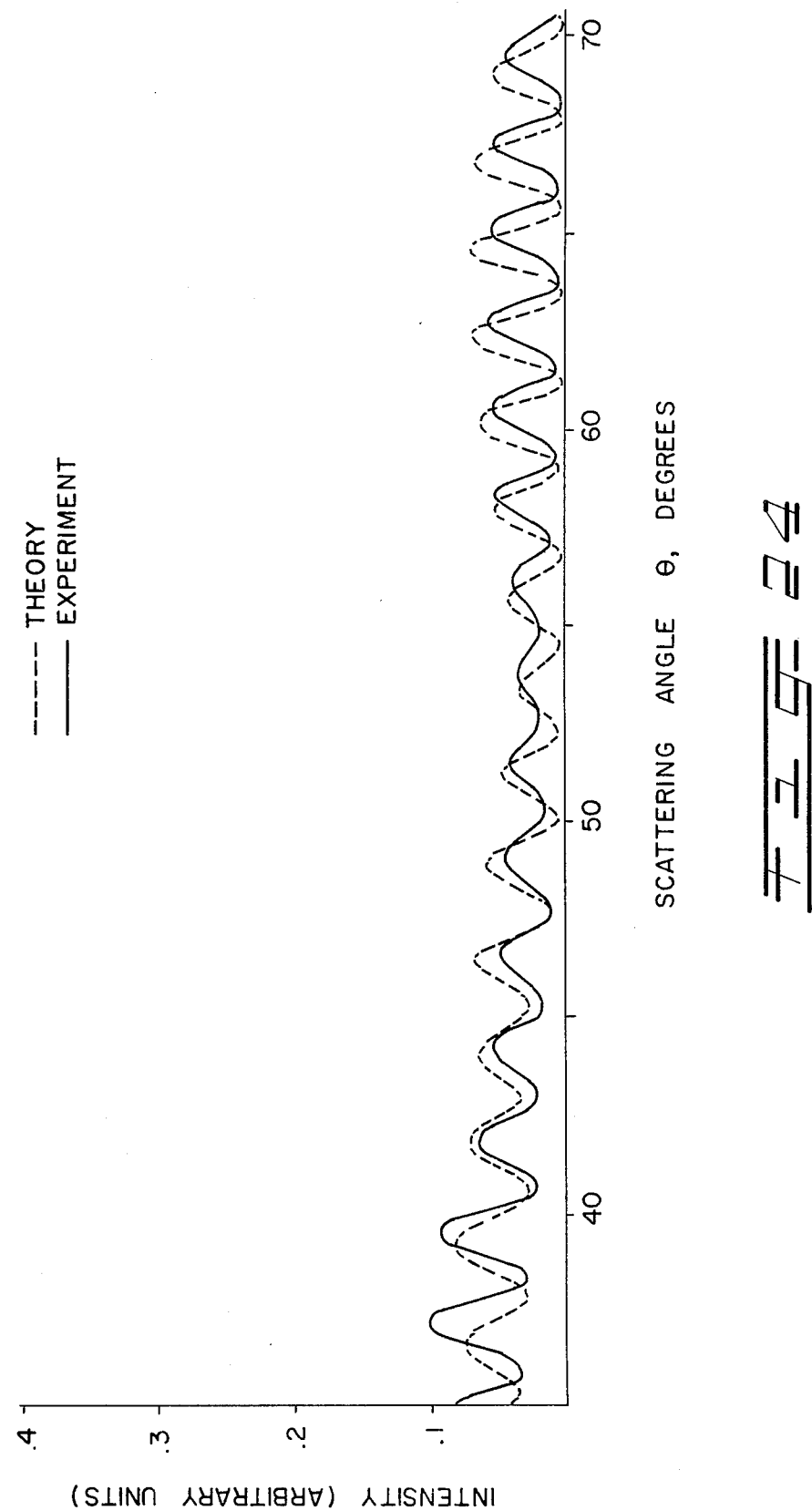
Figure 25:
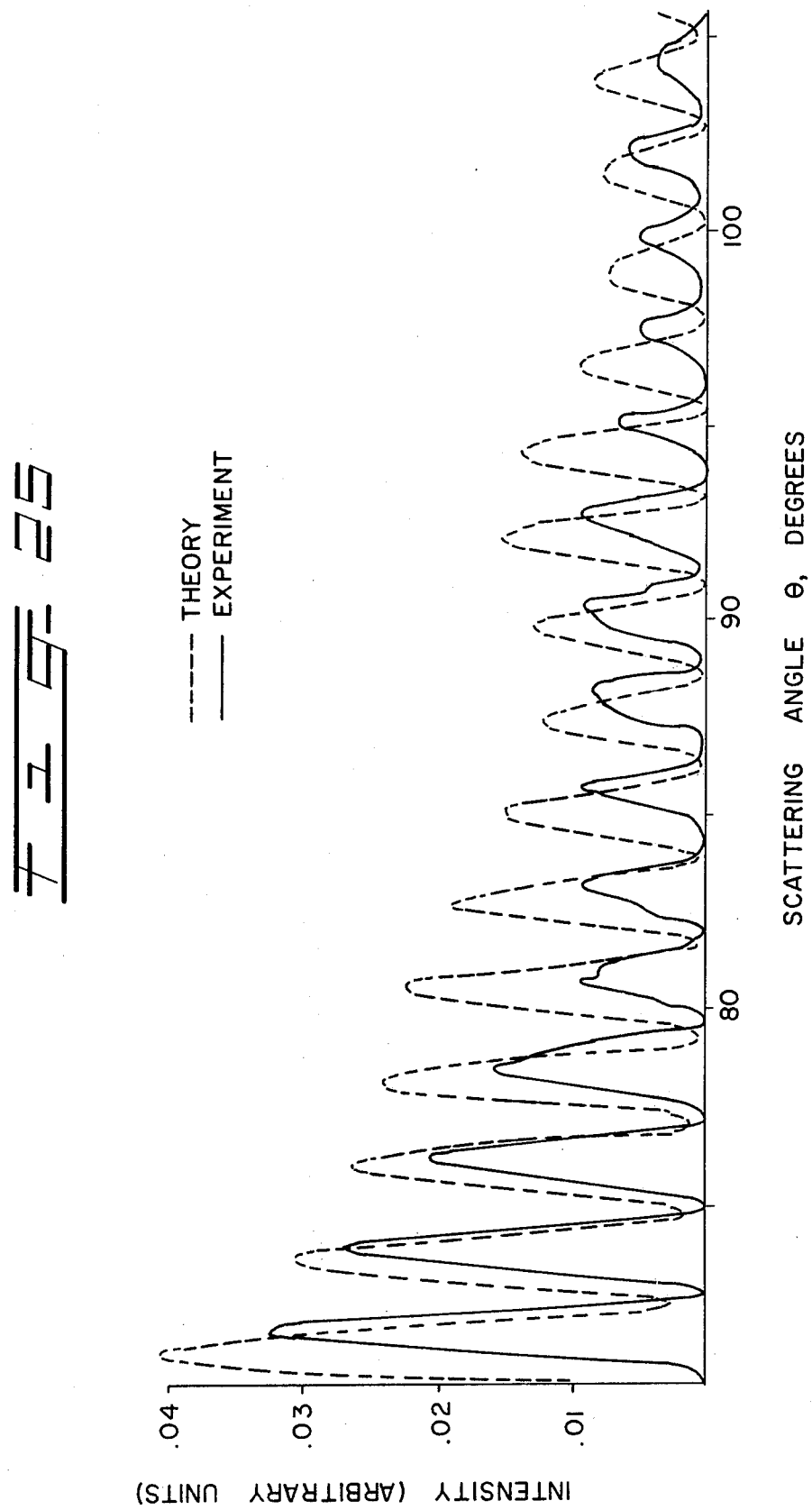
Figure 26:
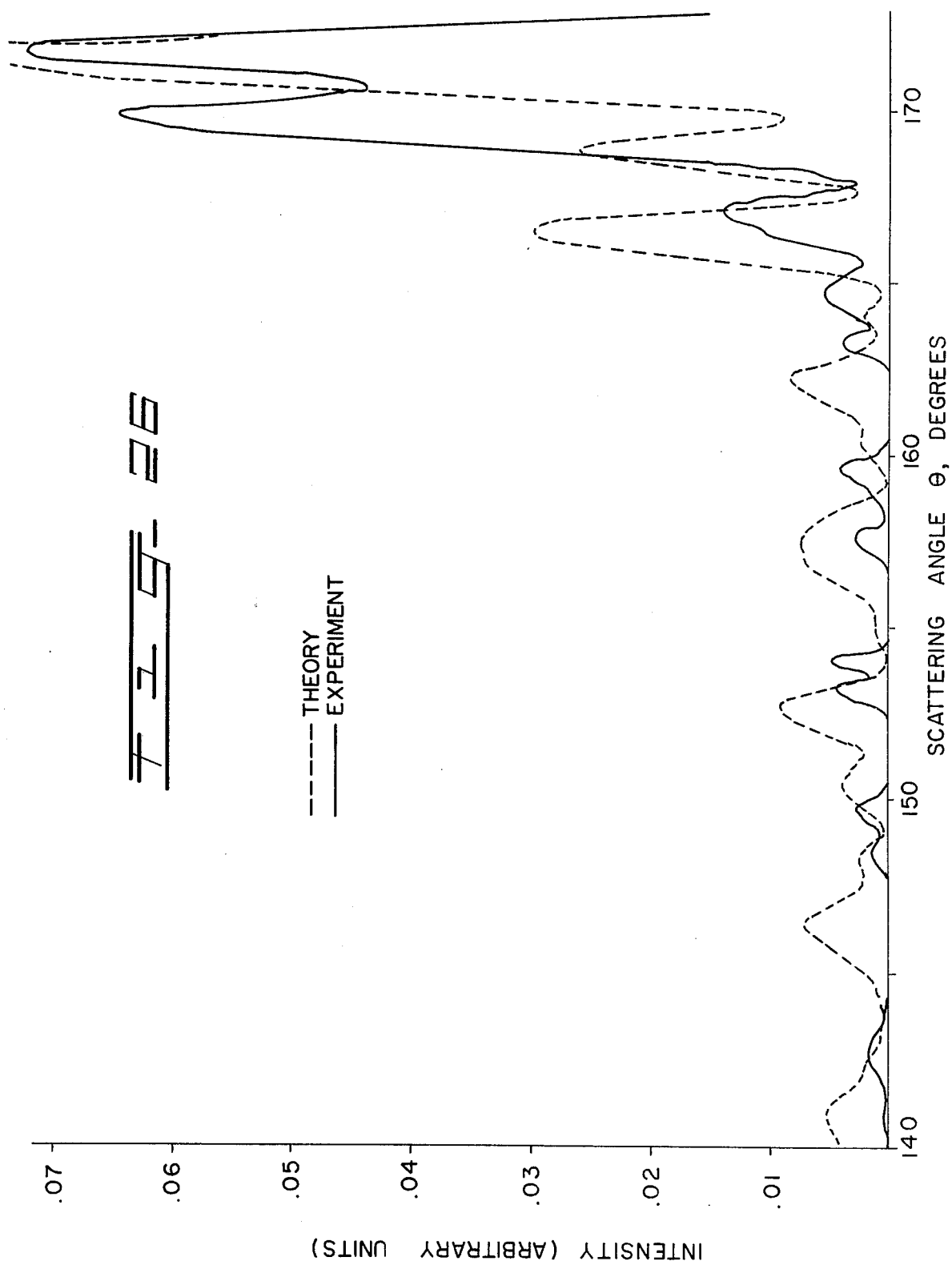

In FIG. 17, a diagram of rays being refracted and reflected by a clad fiber is shown. It can be seen that rays can be refracted either by both the cladding and the core or by the cladding alone. It can also be seen that there is a range of scattering angles within which either type of refraction can produce the same scattering angle. The modulation described above occurs for scattering angles where both types of refraction occur. As indicated in FIG. 16, the number of fringes in angle ranges above $\theta_C$ is substantially independent of the refractive index of the core, thus implying that the light refracted by both cladding and core is less significant and that light refracted only by the cladding predominates in the angle range above $\theta_C$.

From FIG. 17, it can be seen that $\theta_C$, where modulation begins, is the scattering angle of a ray that just grazes the core and that is refracted only by the cladding. For this ray $$\sin \beta_c = a/b \quad (24)$$

and from Snell's law $$\sin \alpha_c = m_1 \sin \beta_c = am_1/b \quad (25)$$

where $m_1$ is the refractive index of the cladding. Since $$\theta_c/2 = \alpha_c - \beta_c \quad (26)$$

then $$\theta_c/2 = \sin^{-1}(am_1/b) - \sin^{-1}(a/b) \quad (27)$$

which can be rewritten $$\theta_c = 2[\sin^{-1}(am_1/b) - \sin^{-1}(a/b)] \quad (28)$$

If $\theta_C$ can be measured the ratio $a/b$ can be determined by rewriting equation (28) to put $a/b$ in terms of $\theta_C$. This can more easily be done by rewritting equation (25) as $$a/b = \sin \alpha_c/m_1 \quad (29)$$

and substituting an expression trigonometrically relating $\alpha_C$ to $\theta_C$, which can be derived from equation (14), so that equation (29) becomes $$a/b = \sin(\theta_c/2)/\sqrt{m_1^2 + 1 - 2m_1 \cos(\theta_c/2)} \quad (30)$$

Thus, the ratio of core radius to cladding or fiber radius (which, of course, is the same as the ratio of core diameter to cladding or fiber diameter) can be determined from $\theta_C$, and given one of these radii (or diameters) and cladding index $m_1$, the other radius (or diameters) can be found.

For values of $\theta$ above $\theta_C$, equation (21) may be used to calculate the fiber diameter since the rays become independent of core parameters. As can be seen from Equation (28), this large angle region, where the scattering pattern fringe position is independent of core index (or size) only exits for medium and small core diameters. In fact, the diameter ratio, $a/b$ must be such that $$a/b < 1/m_1 \quad (3231)$$

for it to exist. For example, if the fiber has an index $m_1 = 1.5$, the core-to-fiber diameter ratio must be less than 0.67.

This result is very important because it means that for fibers with moderate core/cladding ratios, measurements of the scattering pattern fringe positions at large angles (between approximately 50°–90°) may be used to obtain the total fiber diameter, independent of the fiber core diameter and index, provided that the index of the cladding layer is known.

To measure the diameters of both the cladding and the core, then, given the refractive index of the cladding, the diameter of the cladding is first determined by counting fringes between $\theta_1$ and $\theta_2$ and using equation (21) with $\theta_1 > \theta_C$ and $\theta_2 < \theta_F$; then the diameter of the core is found by measuring $\theta_C$ and using equation (30) and the already-determined diameter of the cladding.

In a system wherein a fiber is advanced as the scattering pattern is analyzed, a change in the outer diameter of the fiber will cause a movement of the fringes in the scattering pattern. Thus, the movement of a given number of fringes past a reference point at a scattering angle $\theta_R$ during a given fiber advance can be related to a corresponding change in path-length difference. This latter change is equal to $\lambda N_p$ where $N_p$ is the number of fringes passing the reference point. From equation (19), $\delta d = N_p \lambda / [\sin(\theta_R/2) + \sqrt{m^2 + 1 - 2m \cos(\theta_R/2)}]$ (32)

where $\delta d$ is the change in fiber diameter during the given advance. Of course, $\theta_R$ must be less than $\theta_F$, and for a clad fiber, $\theta_R$ must be greater than $\theta_C$.

Figure 18:
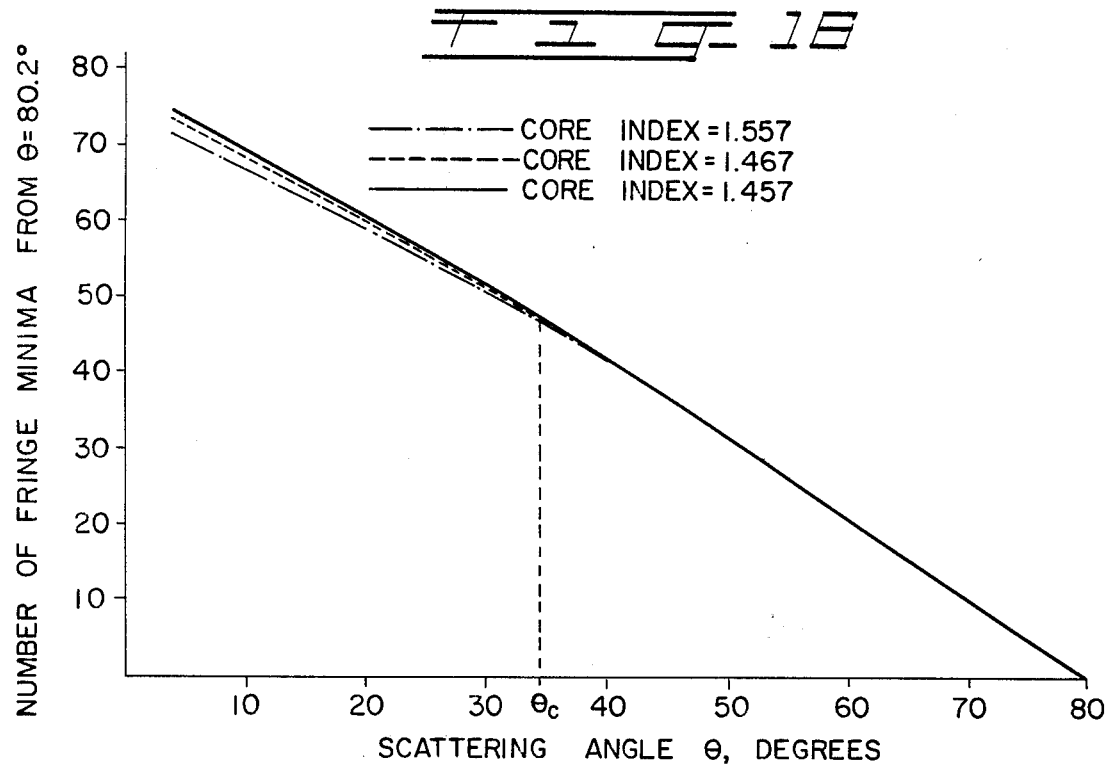
FIG. 18 is a graph similar to FIG. 16, but for a different angle range.

FIG. 18 is an expansion of the lower angle portion of FIG. 16 and shows in greater detail the variation of fringe position with differing core indices. It will be recalled that the angle range shown in FIG. 18 is less than the critical angle $\theta_C$. These graphs will also change with variations in core diameter. The results indicate that measurements which are made on the fringe positions at low diffraction angles will permit either the core diameter or core index to be found, knowing the other. This mesurement technique appears most attractive for core/cladding index differences of greater than 0.01, and it will work with differences as high as 0.1 or more. As shown in FIG. 18, a quartz fiber having a 20µm core whose index was 0.01 greater than the cladding layer yielded one fringe difference at the 10° angle. Thus, the number of fringes must be measured to an accuracy of much less than one fringe in order to give accurate core diameter measurements, but this is no problem.

As in the case of the unclad fiber, geometric theory predicts a cut-off angle $\theta_F$ and its value may be obtained from Equation (23) if Equation (31) holds. As was the case for the unclad fiber, there is no threshold cut-off for the calculated patterns shown in FIG. 16 and so this cannot be used to measure fiber refractive index accurately.

Consider now forward scattering over the range $\theta = 0°$–$7°$, which angle range is very similar to the 0°–7° range used for the unclad fiber. The pattern observed is the combined effect of the interference fringes from refracted and reflected light and the diffraction effects from light not intercepted by the fiber. At these low angles, rays transmitted through the fiber go through both core and cladding and so changes in both core and cladding parameters change the phase of this ray and, thus, the structure of the scattering pattern.

FIGS. 19–22 show the best fit that was obtained between theory and experiment for a typical clad, glass fiber. The fiber was measured to have an outer diameter of 18.6 ±0.5µm using an image-splitting eyepiece. The core index at a wavelength of 0.633µm was 1.616 and the cladding index was 1.518. The core diameter was estimated to be about 15µm using a scanning electron microscope. The theoretical plots in FIGS. 19–22 assumed a fiber having a diameter of 18.25µm and a core diameter of 13.8µm.

Since the core diameter of this experimental sample was so large, there exists no angle where the fringes are independent of core diameter. However, FIG. 16 does show that the fringes are progressively less sensitive to core diameter at larger angles. Therefore, matching was obtained by a "zeroing-in" process wherein a best match was first obtained at the larger angles by varying the fiber diameter. Next, the core diameter was varied to obtain the best match between the small angle patterns, and this process was repeated until the best fit was achieved. It should be noted that the theoretical and experimental scattering intensities shown were normalized so that they were equal at the 13° maximum, for convenience in plotting.

In FIGS. 19–22 the modulation of the intensities does not match very well at the larger angles, that is, larger than approximately 63°. By changing the core diameter to 14.3μm and the fiber diameter to 18.3μm, FIGS. 23–26 were obtained. Here, a much better match of the modulation intensities was obtained; however, the fringe positions do not agree quite so well, especially at the lower angles. This would seem to indicate an incorrect core diameter. It is not known why a better match could not be obtained under these circumstances, but a reasonable explanation might be the existence of small deviations from circularity in the fiber cross section. Also, it was not known how concentric the core was in this experimental fiber. Variations of only 0.1μm in fiber cross section and 0.5μm in concentricity would give the observed variations. It was necessary to calculate patterns to a precision of 0.1μm or better in fiber diameter and 0.5μm in core diameter to obtain a good match. This suggests that this kind of accuracy will be obtained by the fiber diameter measurement device to be described below, which device detects the scattering pattern fringe separations and positions.

FIGS. 23–26 indicate that there is a reasonable agreement between experiment and theory at very large scattering angles, that is, angles greater than approximately 170°, although not as good as was obtained at the lower angles. There were also more violent changes in structure between the theoretical plots of FIGS. 19–22, and FIGS. 23–26, although FIGS. 19–22 seem to match the experimental data more closely.

Figure 27:
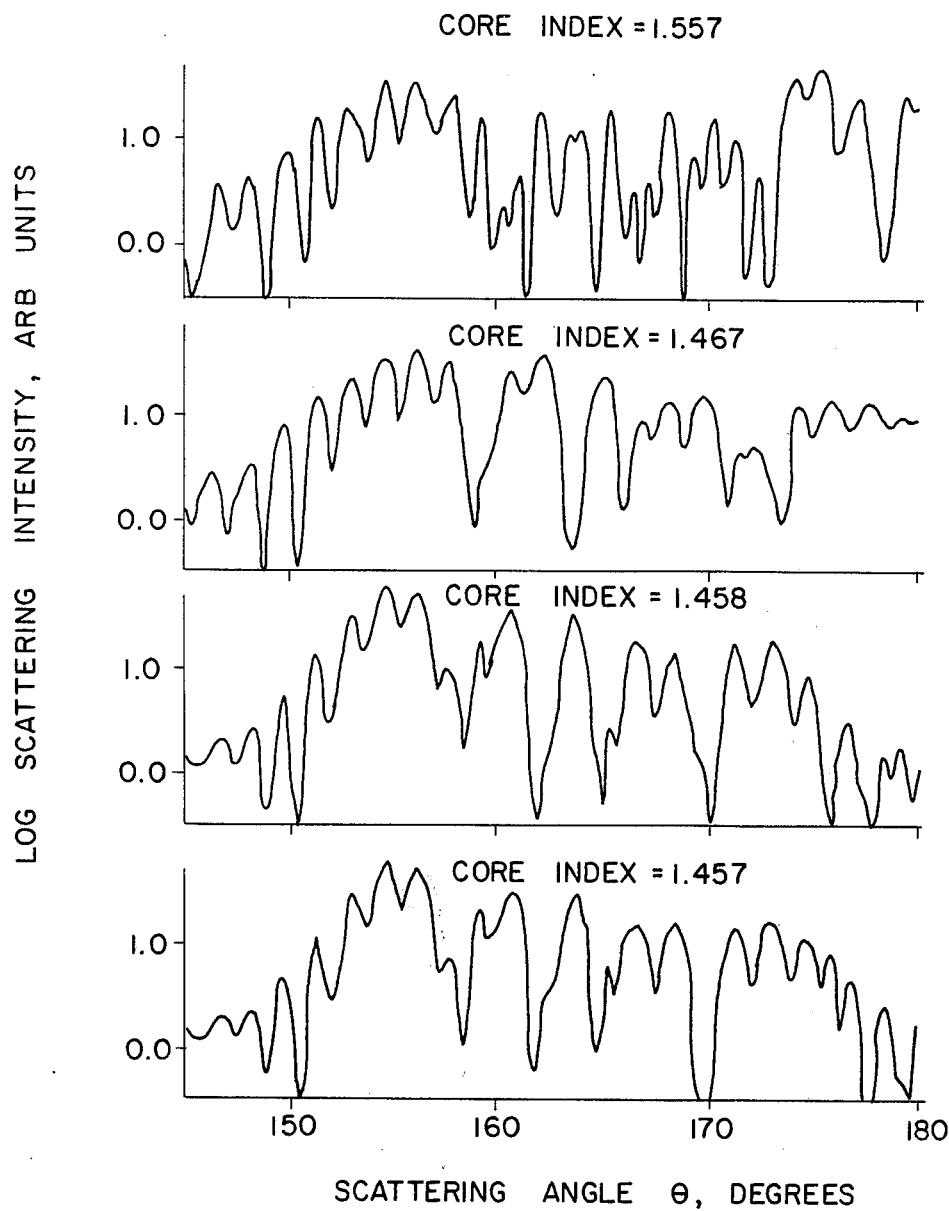
FIG. 27 is a graph showing the scattering pattern of a clad fiber for differing refractive indices.

FIG. 27 is the theoretical scattering pattern for the same 43.05μm fiber discussed earlier but plotted for scattering angles of 145° through 180°. The same four values of core index were used, namely, 1.457, 1.458, 1.467, and 1.557 with a 20μm diameter core. The cladding index was 1.457 so the bottom curve is for an unclad fiber. There were differences found in the structure of the patterns although there is the same cut-off edge at an angle of 151°, in all cases. There were changes evident even for a 0.001 index difference between core and cladding, showing that this part of the scattering pattern is more sensitive from 115° to 180°, than at the smaller scattering angles. The changes are greater, nearer to a 180° scattering angle, than at angles close to 150°.

Figure 28:
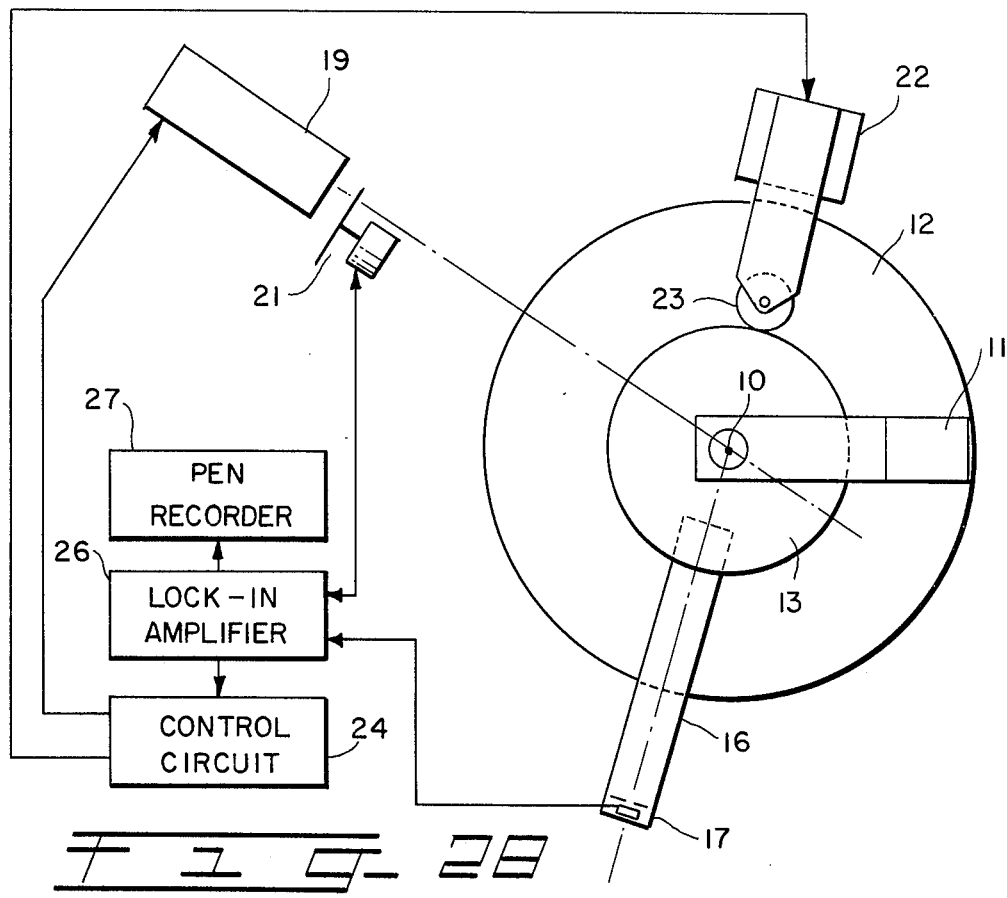
FIG. 28 depicts an illustrative apparatus for practicing the methods of this invention.

FIG. 28 depicts an illustrative apparatus which may be used to perform the measurements on fringe position and amplitude according to the invention. As shown, the fiber 10 to be measured is secured in some suitable holder 11 which is fastened to a spectrometer base 12. A rotatable table 13, coaxial with fiber 10 and base 12, mounts a spectrometer 16 having a slit detector 17 at one end thereof.

A radiant energy source 18, for example, a C. W. HeNe laser, directs a light beam 19 at the fiber 10. The output of the laser is chopped by a rotary chopper 21, as shown.

A synchronous motor 22 drives a wheel 23 which engages the rotatable table 13. A control circuit 24 drives motor 22 and receives the output of a lock-in amplifier 26 which in turn receives the output of slit detector 17 and also drives chopper 21. A pen recorder 27, or other suitable recording device, is also connected to the output of amplifier 26.

In operation, the laser 19 is energized by control circuit 24 and spectrometer 16 rotated to the 0° position. Next, motor 22 is energized to slowly rotate table 13 so that detector 17 views the entire scattering pattern after one complete revolution (360°) has been accomplished. The output of detector 17, synchronized with chopper 21, is displayed on recorder 27 and the recorded trace, of course, contains the amplitude and spatial information required to perform the methods of this invention.

Figure 29:
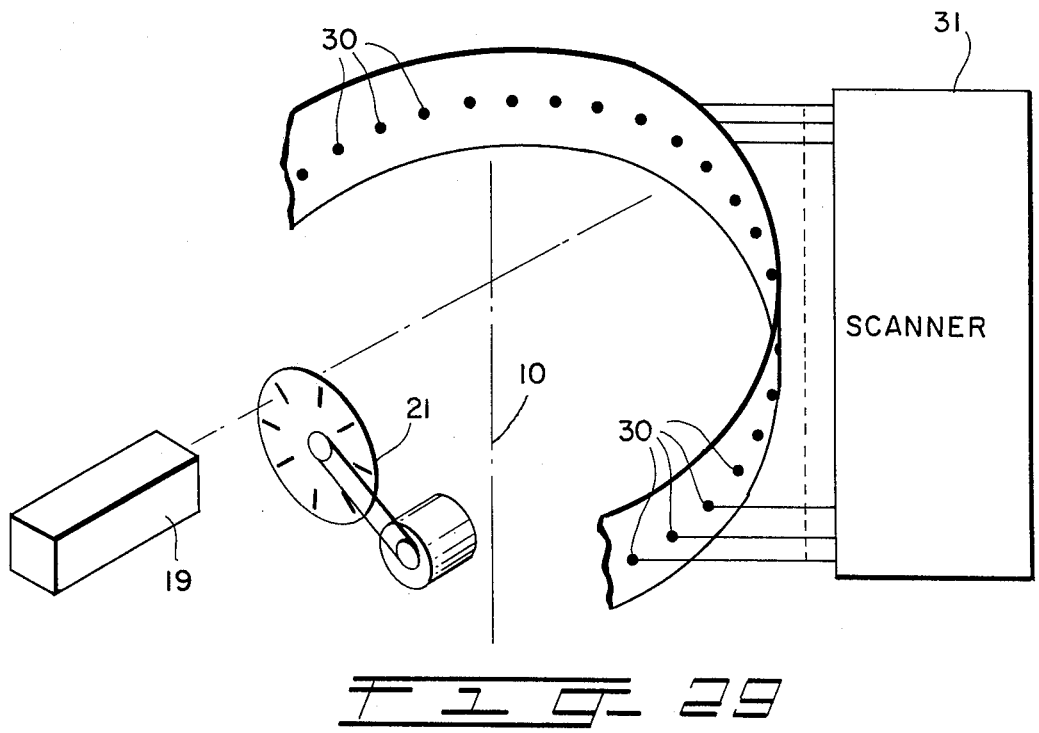
FIG. 29 depicts an alternative embodiment of the apparatus shown in FIG. 28.

If only a limited range of angles need be swept, control circuit 24 can be preset to start and to terminate the rotation of table 13 at the desired angles. Or, if measurements only at a particular angle are required, detector 17 can be fixed. In an on-line process, the output of amplifier 26 would be connected to suitable logic circuitry such that if the parameter being measured, for example fiber diameter, exceeded or fell below some priorly established tolerance limit, a feedback loop could make appropriate changes to the process. Thus, fiber diameter, or any other important parameter, could be maintained to an extremely fine tolerance. In this latter event, a rotating spectrometer would probably be inconvenient so, as shown in FIG. 29, a circular array of photoelectric devices 30, for example photodiodes, and a scanner 31 would be substituted for spectrometer 16, motor 22, etc., in FIG. 1.

The preferred radiant energy source is, of course, a laser. However, other monochromatic, coherent sources, such as a pinhole and a mercury vapor lamp, may also be employed.

One skilled in the art may make various changes and substitutions to the arrangement of parts shown without departing from the spirit and scope of the invention.

What is claimed is:
1. A method of measuring the outer diameter of an optical fiber having an inner core and an outer cladding, given the refractive index of the outer cladding, which comprises:
   directing a beam of coherent, monochromatic radiation at the fiber to generate a far-field scattering pattern, a portion of the scattering pattern resulting from interference between radiation reflected from the outer surface of the fiber and radiation predominated by light passing through and being refracted by the outer cladding;
   counting the number, N, of fringes between a lower scattering angle $\theta_1$ and upper scattering angle $\theta_2$ in said portion of the scattering pattern; and
   calculating the outer diameter, $d$, of the fiber from the relation

$$d = N\lambda/[E(\theta_2) - E(\theta_1)]$$

wherein $$E(\theta_1) = \sin(\theta_1/2) + \sqrt{m_1^2 + 1 - 2m_1 \cos(\theta_1/2)}$$
$$E(\theta_2) = \sin(\theta_2/2) + \sqrt{m_1^2 + 1 - 2m_1 \cos(\theta_2/2)}$$

$m_1$ = the refractive index of the cladding, and
$\lambda$ = the wavelength of the radiation.

2. The method according to claim 1 wherein said beam directing step comprises:
positioning the beam of spatially coherent, monochromatic radiation to impinge upon said filament perpendicular to the longitudinal axis thereof, said beam having an electric field vector which is parallel to said axis.

3. The method according to claim 1 wherein said beam directing step comprises:
positioning the beam of spatially coherent, monochromatic radiation to impinge upon said filament perpendicular to the longitudinal axis thereof, said beam having an electric field vector which is transverse to said axis.

4. The method of claim 1 wherein $\theta_1 > \phi_C$, where $\theta_C$ is the scattering angle below which substantially all the refracted radiation contributing to the scattering pattern passes through both the inner core and the outer cladding.

5. The method of claim 1 wherein $\theta_2 < 2 \cos^{-1}(1/m_1)$.

6. The method of claim 1 wherein the ratio of core diameter to fiber diameter, $a/b$, satisfies the inequality $a/b < 1/m_1$.

7. A method of measuring the ratio between the core diameter and the outer diameter of an optical fiber having an inner core and an outer cladding, given the refractive index of the outer cladding, which comprises:
directing a beam of coherent, monochromatic radiation at the fiber to generate a far-field scattering pattern, a portion of the scattering pattern resulting from interference between radiation reflected from the outer surface of the fiber and radiation passing through and being refracted by the fiber; fringes in a part of said portion of the scattering pattern being modulated by interference between radiation refracted by both the inner core and the outer cladding and radiation refracted only by the outer cladding;
measuring the angle $\theta_C$ where said modulation begins and below which substantially all the refracted light contributing to the scattering pattern passes through both the inner core and the outer cladding; and
calculating the ratio $a/b$ from the relation $$a/b = \sin(\theta_C/2) / \sqrt{m_1^2 + 1 - 2m_1 \cos(\theta_C/2)}$$

wherein
$a$ = the core diameter,
$b$ = the outer diameter, and
$m_1$ = the refractive index of the cladding.

8. The method of claim 7 wherein the ratio $a/b$ satisfies the inequality $a/b < 1/m_1$.

9. The method according to claim 7 wherein said beam directing step comprises:
positioning the beam of spatially coherent, monochromatic radiation to impringe upon said filament perpendicular to the longitudinal axis thereof, said beam having an electric field vector which is parallel to said axis.

10. The method according to claim 7 wherein said beam directing step comprises:
positioning the beam of spatially coherent, monochromatic radiation to impinge upon said filament perpendicular to the longitudinal axis thereof, said beam having an electric field vector which is transverse to said axis.

11. A method of measuring the core diameter of an optical fiber having an inner core and an outer cladding, given the outer diameter of the fiber and the refractive index of the outer cladding, which comprises:
a. directing a beam of coherent, monochromatic radiation at the fiber to generate a far-field scattering pattern, a portion of the scattering pattern resulting from radiation reflected from the outer surface of the fiber and radiation passing through and being refracted by the fiber; fringes in a part of said portion of the scattering pattern being modulated by interference between radiation refracted by both the inner core and the outer cladding and radiation refracted only by the outer cladding;
b. measuring the angle $\theta_C$ where said modulation begins and below which substantially all the refracted light contributing to the scattering pattern passes through both the inner core and the outer cladding;
c. calculating the ratio $a/b$ from the relation $$a/b = \sin(\theta_C/2) / \sqrt{m_1^2 + 1 - 2m_1 \cos(\theta_C/2)}$$

wherein
$a$ = the core diameter,
$b$ = the outer diameter,
$m_1$ = the refractive index of the cladding; and
d. calculating the core diameter $a$ from the given fiber diameter $b$ and the ratio $a/b$ calculated in step (c).

12. The method of claim 11 wherein the ratio $a/b$ satisfies the inequality $a/b < 1/m_1$.

13. The method according to claim 11 wherein said beam directing step comprises:
positioning the beam of spatially coherent, monochromatic radiation to impinge on said filament perpendicular to the longitudinal axis thereof, said beam having an electric field vector which is parallel to said axis.

14. The method according to claim 11 wherein said beam directing step comprises:
positioning the beam of spatially coherent, monochromatic radiation to impinge on said filament perpendicular to the longitudinal axis thereof, said beam having an electric field vector which is transverse to said axis.

15. A method of measuring a change in the outer diameter of a continuously advancing optical fiber having an inner core and an outer cladding, given the refractive index of the outer cladding, which comprises:
directing a beam of coherent monochromatic radiation at the filament to generate a far-field scattering pattern, a portion of the scattering pattern resulting from interference between radiation reflected from the outer surface of the fiber and radiation predominated by light passing through and being refracted by the outer cladding;

at a scattering angle $\theta_R$ in said portion of the pattern counting the number, $N_p$, of fringes that pass as the filament advances a given distance;

calculating the diameter change, $\delta d$, in the given distance from the relation $$\delta d = \lambda N_p / [\sin(\theta_R/2) + \sqrt{m_1^2 + 1 - 2m_1 \cos(\theta_R/2)}]$$

wherein $m_1$ = the refractive index of the cladding, and
$\lambda$ = the wavelength of the light; and wherein $\theta_R > \theta_C$, where $\theta_C$ is the scattering angle below which substantially all the refracted radiation contributing to the scattering pattern passes through both the inner core and the outer cladding.

16. The method of claim 15 wherein $\theta_R < 2 \cos^{-1}(1/m_1)$.

17. The method of claim 15 wherein the ratio of core diameter to fiber diameter, $a/b$, satisfies the inequality $a/b < 1/m_1$.

18. The method according to claim 15 wherein said beam directing step comprises:

positioning the beam of spatially coherent, monochromatic radiation to impinge on said filament perpendicular to the longitudinal axis thereof, said beam having an electric field vector which is parallel to said axis.

19. The method according to claim 15 wherein said beam directing step comprises:

positioning the beam of spatially coherent, monochromatic radiation to impinge on said filament perpendicular to the longitudinal axis thereof, said beam having an electric field vector which is transverse to said axis.

* * * * *

UNITED STATES PATENT OFFICE
CERTIFICATE OF CORRECTION

Patent No. 3,982,816  Dated September 28, 1976

Inventor(s) LAURENCE SHRAPNELL WATKINS  Page 1 of 4

It is certified that error appears in the above-identified patent and that said Letters Patent are hereby corrected as shown below:

In the specification, Column 2, line 26, "meaasure" should read --measure--; line 55, "m =" should read --$m_1$ = --. Column 3, line 41, "graph" should read --graphs--; line 52, "or example" should read --for example--. Column 4, line 26, "$\theta = 0^{20}$," should read --$\theta = 0°$,--; lines 51-53, equation (1), " (R > b)     $U = \sum\limits_{n=-\infty}^{\infty} F_n \{J_n(kr) - {}_n{}^o H_n(kr)\}$ "  should read --(r > b)     $u = \sum\limits_{n=-\infty}^{\infty} F_n \{J_n(kr) - b_n^o H_n(kr)\}$ --;

line 55, equation (2), that portion of the equation reading

" = $\sum\limits_{N=-\infty}^{\infty}$ "  should read -- = $\sum\limits_{n=-\infty}^{\infty}$ --;

line 58, equation (3), that portion of the equation reading

" (r < a)    $u = \sum\limits_{N=-\infty}^{\infty}$ "  should read --(r < a)    $u = \sum\limits_{n=-\infty}^{\infty}$ --.

Column 5, lines 32-37, equation (6),

" $I_p = \left| \dfrac{2}{\pi k r} e(-ikr + iwt - i3\pi/4) \sum\limits_{n=-\infty}^{\infty} b_n^o e^{in\theta} \right|^2$ $= \dfrac{\lambda}{2\pi r} \left| b_0^o + 2 \sum\limits_{n=1}^{\infty} b_n^o \cos(n\theta) \right|^2,$ "

UNITED STATES PATENT OFFICE
CERTIFICATE OF CORRECTION

Patent No. 3,982,816  Dated September 28, 1976

Inventor(s) LAURENCE SHRAPNELL WATKINS

It is certified that error appears in the above-identified patent and that said Letters Patent are hereby corrected as shown below:

equation (6) should read $$-- I_p = \left| \frac{2}{\pi kr} e^{(-ikr + iwt - i3\frac{\pi}{4})} \sum_{n=-\infty}^{\infty} b_n^o e^{in\theta} \right|^2$$

$$= \frac{\lambda}{\pi^2 r} \left| b_0^o + 2 \sum_{n=1}^{\infty} b_n^o \cos(n\theta) \right|^2, --;$$

line 68, "tens" should read --tend--. Column 6, line 32, "value within range." should read --values within range.--; line 45, "Yn" should read --$Y_n$--; same line "Yo" should read --$Y_o$--; lines 51-52, second line of equation (10), $$" + \frac{(-1)(-9)(-25)(-49)}{4!(8\alpha)^4} \right\} \quad " \text{ should read}$$

$$-- + \frac{(-1)(-9)(-25)(-49)}{4!(8\alpha)^4} - .. \right\} --;$$

lines 54-55, third line of equation (10), that portion of the equation reading $$" - \frac{(-1)(-9)(-25)}{3!(8\alpha)^3} + \right\} \right] \quad " \text{ should read}$$

$$-- - \frac{(-1)(-9)(-25)}{3!(8\alpha)^3} + . . \right\} \right] \quad --;$$

UNITED STATES PATENT OFFICE
CERTIFICATE OF CORRECTION

Patent No. 3,982,816   Dated September 28, 1976   Page - 3 of 4

Inventor(s) LAURENCE SHRAPNELL WATKINS

It is certified that error appears in the above-identified patent and that said Letters Patent are hereby corrected as shown below:

Column 6, line 67, equation (12), that portion of the equation reading

" $= C_{\ell+1}(\alpha)$ " should read -- $= C_{\ell-1}(\alpha)$ --.

Column 7, line 35, "was affect" should read --way affects--.
Column 8, line 12, "$(\pi/4)$" should read --$(\lambda/4)$--; line 22, equation (14), that portion of the equation reading "tan 60 = " should read --tan $\alpha$ = --; line 36, " $\lambda 12$" should read -- $\lambda/2$--; same line, "to reflection" should read --for reflection--; line 40, "(17) /4" should read --(17)--; line 45, equation (18), " $\Delta = 2[mb \cos [\alpha - (\theta/2)] - b \cos \alpha + b \sin (\theta/2)] + \lambda/4$ "

should read

-- $\Delta = 2\left[mb \cos [\alpha - (\theta/2)] - b \cos \alpha + b \sin (\theta/2)\right] + \lambda/4$ --;

line 51, equation (19), that portion of the equation reading

" $\sqrt{m^2 + 1 - 2m \cos (\theta/2)]} + \lambda/4$ " should read

-- $\sqrt{m^2 + 1 - 2m \cos (\theta/2)}\right] + \lambda/4$ --.

Column 9, line 9, that portion of the equation reading
" $= \sin (\theta_2/2/2)$ " should read -- $= \sin (\theta_2/2)$ --; line 22, "equation (2 )." should read --equation (21).--; line 40, "$\theta_2 < \theta F$" should read --$\theta_2 < \theta_F$--. Column 11, line 47, "about" should read --above--. Column 12, lines 17-18, "axis, of which" should read --axis, which--.

UNITED STATES PATENT OFFICE
CERTIFICATE OF CORRECTION

Patent No. 3,982,816  Dated September 28, 1976

Inventor(s) LAURENCE SHRAPNELL WATKINS  Page - 4 of 4

It is certified that error appears in the above-identified patent and that said Letters Patent are hereby corrected as shown below:

Column 13, line 53, "exits" should read --exists--; line 57, "(3231" should read --(31)--. Column 14, lines 16-18, "fringes passing the reference point. From equation (19), $\delta d = N_p \lambda / [\sin(\theta_R/2) + \sqrt{m^2 + 1 - 2m \cos(\theta_R/2)}]$  (32)"

should read

--fringes passing the reference point. From equation (19), $\partial d = N_p \lambda / \left[ \sin(\theta_R/2) + \sqrt{m^2 + 1 - 2m \cos(\theta_R/2)} \right]$  (32) --.

Column 14, line 20, "$\delta d$" should read --$\partial d$--; line 32, "mesurement" should read --measurement--; line 62, "$\pm 0.5 \mu m$" should read --$\pm 0.5 \mu m$--.

In the claims, Column 17, line 20, "$\theta_1 > \phi_C$" should read --$\theta_1 > \theta_C$--. Column 19, line 7, that portion of the equation reading "$[\sin(\theta_R/2) + .$" should read --$[\sin(\theta_R/2) + $--.

Signed and Sealed this

Fourteenth Day of December 1976

[SEAL]

Attest:

RUTH C. MASON
Attesting Officer

C. MARSHALL DANN
Commissioner of Patents and Trademarks